United States Patent
Digmann et al.

(10) Patent No.: US 9,797,128 B2
(45) Date of Patent: Oct. 24, 2017

(54) VEHICLE-ACTUATED WEATHER BARRIER APPARATUS

(71) Applicants: Charles Digmann, Dubuque, IA (US); Leif Kniese, Berlin (DE); Rudolf Bannasch, Berlin (DE)

(72) Inventors: Charles Digmann, Dubuque, IA (US); Leif Kniese, Berlin (DE); Rudolf Bannasch, Berlin (DE)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 14/843,628

(22) Filed: Sep. 2, 2015

(65) Prior Publication Data

US 2015/0376893 A1    Dec. 31, 2015

Related U.S. Application Data

(63) Continuation of application No. 13/933,805, filed on Jul. 2, 2013, now Pat. No. 9,162,832.

(51) Int. Cl.
*B65G 69/00* (2006.01)
*B65G 67/00* (2006.01)
(Continued)

(52) U.S. Cl.
CPC ............ *E04B 1/344* (2013.01); *B65G 69/008* (2013.01); *B65G 69/287* (2013.01);
(Continued)

(58) Field of Classification Search
CPC ..... E06B 3/30; E06B 7/28; E06B 7/26; E04H 14/00; E04H 15/20; E04H 15/58; B65G 69/008; B65G 69/00; B65G 67/00
See application file for complete search history.

(56) References Cited

U.S. PATENT DOCUMENTS 1,327,807 A   1/1920   Burleigh
2,087,758 A   7/1937   Friend
(Continued)

FOREIGN PATENT DOCUMENTS

AU   6563380   1/1983
CH   600117    6/1978
(Continued)

OTHER PUBLICATIONS

International Bureau, "International Preliminary Report on Patentability," issued in connection with international application serial No. PCT/US2010/031581, dated Nov. 3, 2011, 14 pages.
(Continued)

*Primary Examiner* — Phi A
(74) *Attorney, Agent, or Firm* — Hanley, Flight & Zimmerman, LLC

(57) ABSTRACT

Example weather barrier apparatus are disclosed herein. An example weather barrier apparatus includes a mount to couple to a wall of a loading dock and a seal coupled to the mount. The seal includes an outer flexible sheet having a first end and a second end. The seal includes an inner flexible sheet having a third end and a fourth end. The third end of the inner flexible sheet couples to the first end of the outer flexible sheet and the fourth end of the inner flexible sheet couples to the second end of the outer flexible sheet. The inner flexible sheet provides an edge seal and a surface seal. The edge seal engages a rearward facing edge of a vehicle and the surface seal engages surface panel of the vehicle when the vehicle is in engagement with the seal. A guide movably couples the outer flexible sheet and the inner flexible sheet. The guide is positioned between the respective ends of the inner and outer flexible sheets. The guide spaces apart a portion of the inner flexible sheet from a portion of the outer flexible sheet. The inner flexible sheet,
(Continued)

the outer flexible sheet and the guide are to move between a first position and a second position in response to a force imparted to the weather barrier by the vehicle when the vehicle is in engagement with the inner flexible sheet to enable at least one of the edge seal to conform to a shape of the rearward facing edge of the vehicle or the surface seal to conform to a shape of the surface panel of the vehicle.

17 Claims, 32 Drawing Sheets

(51) Int. Cl.
 *E04H 15/20* (2006.01)
 *E04B 1/344* (2006.01)
 *B65G 69/28* (2006.01)
 *E04H 15/58* (2006.01)

(52) U.S. Cl.
 CPC ............ *E04B 1/3441* (2013.01); *B65G 69/00* (2013.01); *E04H 15/20* (2013.01); *E04H 15/58* (2013.01)

(56) References Cited

U.S. PATENT DOCUMENTS

| | | |
|---|---|---|
| 2,273,207 A | 2/1942 | Kuhn |
| 2,688,164 A | 9/1954 | Nelson |
| 2,706,825 A | 4/1955 | Blakeman |
| 2,892,463 A | 6/1959 | Frommelt et al. |
| 3,091,808 A | 6/1963 | Dakin |
| 3,216,433 A | 11/1965 | D'Azzo |
| 3,322,132 A | 5/1967 | Rieder et al. |
| 3,352,314 A | 11/1967 | Frommelt et al. |
| 3,375,625 A | 4/1968 | Edkins et |
| 3,406,422 A | 10/1968 | Nichols |
| 3,461,627 A | 8/1969 | Conger et al. |
| 3,538,655 A | 11/1970 | Frommelt et al. |
| 3,541,626 A | 11/1970 | Eggert, Jr. |
| 3,638,667 A | 2/1972 | Frommelt et al. |
| 3,641,604 A | 2/1972 | Eggert, Jr. |
| 3,665,997 A | 5/1972 | Smith et al. |
| 3,731,828 A | 5/1973 | Clarke et al. |
| 3,750,739 A | 8/1973 | McGuire |
| 3,811,222 A | 5/1974 | Economou |
| 3,877,750 A | 4/1975 | Scholpp |
| 3,951,395 A | 4/1976 | Hennenfent et al. |
| 4,003,170 A | 1/1977 | Mellyn |
| 4,070,801 A | 1/1978 | O'Neal |
| 4,120,067 A | 10/1978 | Hone et al. |
| 4,333,195 A | 6/1982 | Lichti |
| 4,494,341 A | 1/1985 | Schwab |
| 4,554,768 A | 11/1985 | Srajer |
| 4,574,543 A | 3/1986 | Crosson |
| 4,623,157 A | 11/1986 | Rohs |
| 4,671,029 A | 6/1987 | Bennett et al. |
| 4,719,826 A | 1/1988 | DuBois |
| 4,724,648 A | 2/1988 | Diepholder |
| 4,785,594 A | 11/1988 | Alten |
| 4,805,362 A | 2/1989 | Frommelt et al. |
| 5,125,196 A | 6/1992 | Moody |
| 5,185,977 A | 2/1993 | Brockman et al. |
| 5,195,285 A | 3/1993 | Alten |
| 5,240,308 A | 8/1993 | Goldstein et al. |
| 5,282,342 A | 2/1994 | Brockman et al. |
| 5,328,245 A | 7/1994 | Marks et al. |
| 5,341,613 A | 8/1994 | Brockman et al. |
| 5,394,662 A | 3/1995 | Giuliani et al. |
| 5,450,696 A | 9/1995 | Alten |
| 5,518,294 A | 5/1996 | Ligon, Sr. et al. |
| 5,611,104 A | 3/1997 | DeMars |
| 5,622,016 A | 4/1997 | Frommelt et al. |
| 5,795,002 A | 8/1998 | Boron |
| 5,927,025 A | 7/1999 | Brockman et al. |
| 5,953,868 A | 9/1999 | Giuliani et al. |
| 5,954,399 A | 9/1999 | Hong |
| 5,964,780 A | 10/1999 | Balazs |
| 6,089,178 A | 7/2000 | Yamamoto et al. |
| 6,205,721 B1 | 3/2001 | Ashelin et al. |
| 6,609,754 B2 | 8/2003 | Rajasingham |
| 6,746,287 B2 | 6/2004 | Yamamoto et al. |
| 6,820,933 B2 | 11/2004 | Fereira Da Silva |
| 6,986,549 B2 | 1/2006 | Kniese |
| 7,444,785 B2 * | 11/2008 | Dillon .................. B65G 69/001 14/71.1 |
| 7,526,828 B2 | 5/2009 | Kniese |
| 7,757,442 B2 | 7/2010 | Hoffmann et al. |
| 8,156,995 B2 * | 4/2012 | Kniese ................. B65G 69/008 160/188 |
| 8,540,007 B2 * | 9/2013 | Kniese ................. B65G 69/008 160/188 |
| 8,656,656 B2 | 2/2014 | Grunewald |
| 8,733,034 B2 | 5/2014 | Ballester |
| 9,162,832 B2 | 10/2015 | Digmann et al. |
| 9,534,372 B2 | 1/2017 | Digmann et al. |
| 9,534,373 B2 | 1/2017 | Digmann et al. |
| 2002/0095739 A1 | 7/2002 | Dingert |
| 2002/0110423 A1 * | 8/2002 | Miller .................. B65G 69/008 405/110 |
| 2002/0124491 A1 | 9/2002 | Hahn et al. |
| 2004/0000105 A1 | 1/2004 | Brockman et al. |
| 2004/0163326 A1 * | 8/2004 | Miller .................. B65G 69/008 52/2.12 |
| 2004/0183348 A1 | 9/2004 | Kniese |
| 2006/0032159 A1 | 2/2006 | Eungard et al. |
| 2006/0090407 A1 | 5/2006 | Hoffmann et al. |
| 2007/0094834 A1 | 5/2007 | Gil |
| 2007/0283636 A1 * | 12/2007 | Bernacki .............. B65G 69/008 52/173.2 |
| 2008/0034683 A1 | 2/2008 | Hoffmann |
| 2009/0288266 A1 | 11/2009 | Dingert et al. |
| 2009/0293371 A1 | 12/2009 | Digmann et al. |
| 2010/0058682 A1 | 3/2010 | Grunewald |
| 2010/0251639 A1 | 10/2010 | Hoffmann et al. |
| 2010/0263500 A1 | 10/2010 | Bannasch et al. |
| 2010/0263803 A1 | 10/2010 | Kniese |
| 2010/0269427 A1 | 10/2010 | Digmann et al. |
| 2011/0281479 A1 | 11/2011 | Bannasch et al. |
| 2015/0007509 A1 | 1/2015 | Digmann et al. |
| 2015/0368053 A1 | 12/2015 | Digmann et al. |
| 2015/0376892 A1 | 12/2015 | Digmann et al. |
| 2015/0376894 A1 | 12/2015 | Digmann et al. |

FOREIGN PATENT DOCUMENTS

| | | |
|---|---|---|
| CN | 101094801 | 12/2007 |
| CN | 102046502 | 5/2011 |
| CN | 103025634 | 4/2013 |
| DE | 4121768 | 10/1992 |
| DE | 4411610 | 10/1995 |
| DE | 4432656 | 3/1996 |
| DE | 19537320 | 4/1997 |
| DE | 20215674 | 1/2003 |
| DE | 10154969 | 6/2003 |
| DE | 20318845 | 3/2004 |
| DE | 102005010380 | 9/2006 |
| DE | 102006009559 | 5/2007 |
| DE | 102007026721 | 5/2008 |
| EP | 0453713 | 10/1991 |
| EP | 0489237 | 6/1992 |
| EP | 0602501 | 6/1994 |
| EP | 0860355 | 8/1998 |
| EP | 1203640 | 5/2002 |
| EP | 1224901 | 7/2002 |
| EP | 1316651 | 6/2003 |
| EP | 2327623 | 6/2011 |
| FR | 545837 | 10/1922 |
| FR | 1068390 | 6/1954 |
| FR | 1087906 | 3/1955 |
| FR | 2266805 | 10/1975 |
| FR | 2715124 | 7/1995 |
| GB | 2115041 | 9/1983 |

(56) References Cited

FOREIGN PATENT DOCUMENTS

| | | |
|---|---|---|
| GB | 2297478 | 1/1996 |
| JP | 02003231496 A | 8/2003 |
| JP | 2009084015 | 4/2009 |
| LU | 88528 | 3/1996 |
| WO | WO9707707 | 3/1997 |
| WO | WO9908570 | 2/1999 |
| WO | WO0030494 | 6/2000 |
| WO | WO03039816 | 5/2003 |
| WO | WO2009039231 | 3/2009 |

OTHER PUBLICATIONS

United States Patent and Trademark Office, "Notice of Allowance," issued in connection with U.S. Appl. No. 10/476,940, dated Nov. 26, 2004, 11 pages.
United States Patent and Trademark Office, "Notice of Allowance," issued in connection with U.S. Appl. No. 11/815,991, dated Dec. 18, 2008, 10 pages.
United States Patent and Trademark Office, "Non-Final Office Action," issued in connection with U.S. Appl. No. 11/815,991, dated Aug. 20, 2008, 18 pages.
United States Patent and Trademark Office, "Notice of Allowance," issued in connection with U.S. Appl. No. 12/442,683, dated Nov. 30, 2011, 12 pages.
United States Patent and Trademark Office, "Non-Final Office Action," issued in connection with U.S. Appl. No. 12/442,683, dated Jul. 27, 2011, 10 pages.
International Searching Authority, "International Search Report," issued in connection with international application serial No. PCT/US2010/031581, dated Aug. 5, 2010, 5 pages.
International Searching Authority, "Written Opinion of the International Searching Authority," issued in connection with international application serial No. PCT/US2010/031581, dated Aug. 5, 2010, 15 pages.
International Searching Authority, "Partial Search Report," issued in connection with international application serial No. PCT/US2010/031581, dated Jun. 8, 2010, 1 page.
United States Patent and Trademark Office, "Non-Final Office Action," issued in connection with U.S. Appl. No. 12/426,685, dated May 26, 2011, 10 pages.
United States Patent and Trademark Office, "Notice of Allowance," issued in connection with U.S. Appl. No. 12/426,685, dated Dec. 12, 2011, 18 pages.
United States Patent and Trademark Office, "Supplemental Notice of Allowability," issued in connection with U.S. Appl. No. 12/426,685, dated Jan. 4, 2012, 13 pages.
United States Patent and Trademark Office, "Supplemental Notice of Allowability," issued in connection with U.S. Appl. No. 12/426,685, dated Feb. 23, 2012, 6 pages.
United States Patent and Trademark Office, "Requirement for Restriction/Election," issued in connection with U.S. Appl. No. 12/426,685, dated Dec. 14, 2010, 5 pages.
European Patent Office. "Decision to Grant." issued in connection with European application serial No. 10 714 817.3, dated Feb. 7, 2013, 1 page.
European Patent Office, "Office Communication," issued in connection with application serial No. 10 714 817.3, dated Dec. 28, 2011, 2 pages.
United States Patent and Trademark Office, "Non-Final Office Action," issued in connection with U.S. Appl. No. 13/446,838, dated Jan. 8, 2013, 5 pages.
United States Patent and Trademark Office, "Notice of Allowance," issued in connection with U.S. Appl. No. 13/446,838, dated May 22, 2013, 17 pages.
United States Patent and Trademark Office, "Supplemental Notice of Allowability," issued in connection with U.S. Appl. No. 13/446,838, dated Sep. 5, 2013, 2 pages.
International Searching Authority, "International Search Report" issued in connection with PCT Application No. PCT/US2014/044107, dated Oct. 22, 2014, 6 pages.
International Searching Authority, "Written Opinion of the International Searching Authority" issued in connection with PCT Application No. PCT/US2014/044107, dated Oct. 22, 2014, 7 pages.
United States Patent and Trademark Office, "Non-Final Office Action," issued in connection with U.S. Appl. No. 13/933,805, dated Nov. 20, 2014, 8 pages.
United States Patent and Trademark Office, "Notice of Allowance," issued in connection with U.S. Appl. No. 13/933,805, dated Jun. 5, 2015, 10 pages.
United States Patent and Trademark Office, "Supplemental Notice of Allowability," issued in connection with U.S. Appl. No. 13/933,805, dated Jul. 10, 2015, 6 pages.
United States Patent and Trademark Office, "Requirement for Restriction/Election," issued in connection with U.S. Appl. No. 13/933,805, dated Sep. 11, 2014, 5 pages.
Patent Cooperation Treaty, "International Preliminary Report on Patentability," issued in connection with Application No. PCT/US2014/044107, dated Jan. 5, 2016, 8 pages.
United States Patent and Trademark Office, "Non-Final Office Action," issued in connection with U.S. Appl. No. 14/843,613, dated Mar. 11, 2016, 21 pages.
United States Patent and Trademark Office, "Non-Final Office Action," issued in connection with U.S. Appl. No. 14/843,615, dated Mar. 11, 2016, 23 pages.
United States Patent and Trademark Office, "Non-Final Office Action," issued in connection with U.S. Appl. No. 14/843,622, dated Mar. 24, 2016, 23 pages.
European Patent Office, "Communication pursuant to Rules 161(1) and 162 EPC", issued in connection with European patent application No. 14739656.8, mailed on Mar. 11, 2016, 2 pages.
United States Patent and Trademark Office, "Notice of Allowance", issued in connection with U.S. Appl. No. 14/843,615, dated Sep. 15, 2016, 19 pages.
United States Patent and Trademark Office, "Final Office action", issued in connection with U.S. Appl. No. 14/843,613, dated Aug. 25, 2016, 17 pages.
United States Patent and Trademark Office, "Notice of Allowance", issued in connection with U.S. Appl. No. 14/843,622, dated Oct. 13, 2016, 23 pages.
United States Patent and Trademark Office, "Non-Final Office Action", issued in connection with U.S. Appl. No. 14/843,613, dated Dec. 20, 2016 (10 pages).
Canadian Intellectual Property Office, "Notice of Allowance," issued in connection with Canadian Patent Application No. 2,916,510, dated Mar. 29, 2017, 1 page.
Canadian Intellectual Property Office, "Office Action," issued in connection with Canadian Patent Application No. 2,916,510, dated Nov. 17, 2016, 4 pages.
State Intellectual Property Office of The People's Republic of China, "First Office Action," issued in connection Chinese Patent Application No. 2014800482746, dated Nov. 2, 2016, 13 pages.

\* cited by examiner

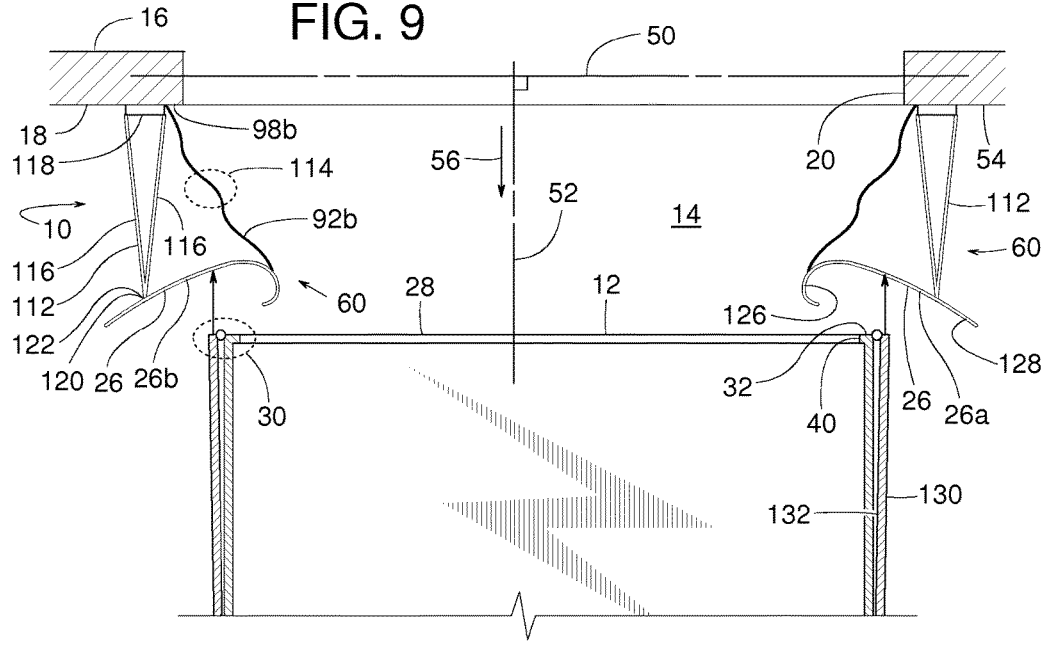
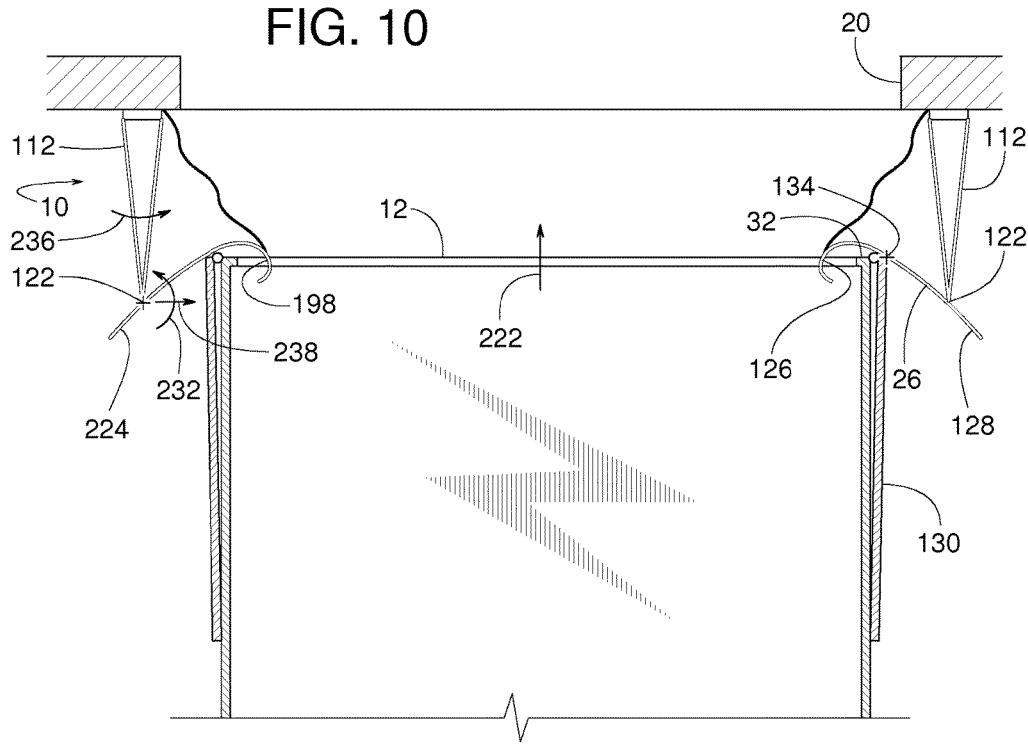

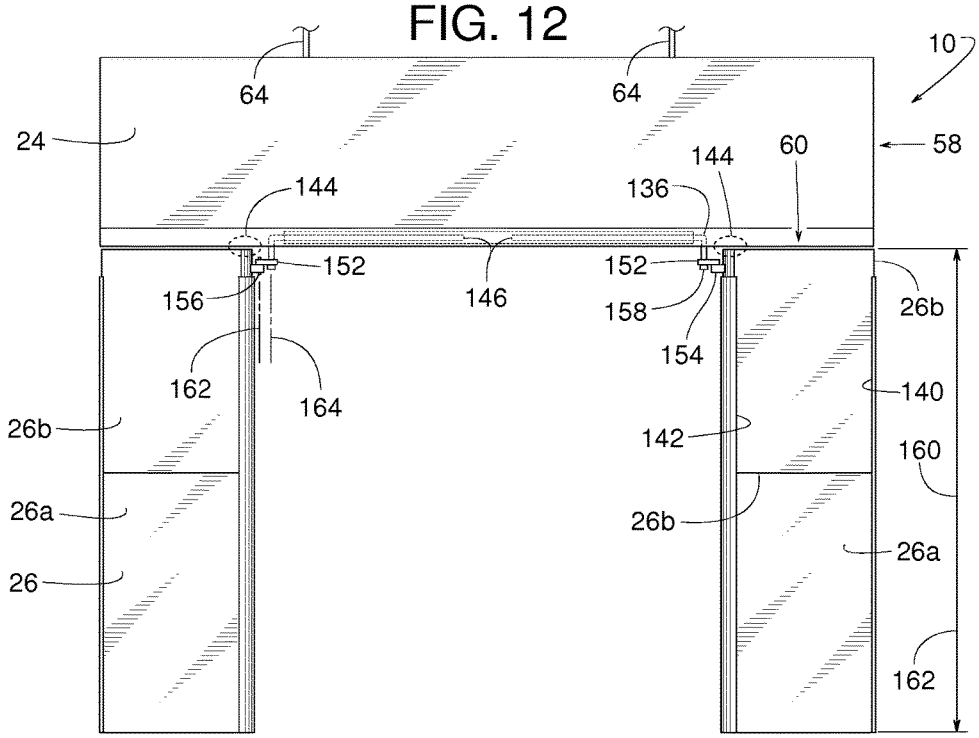
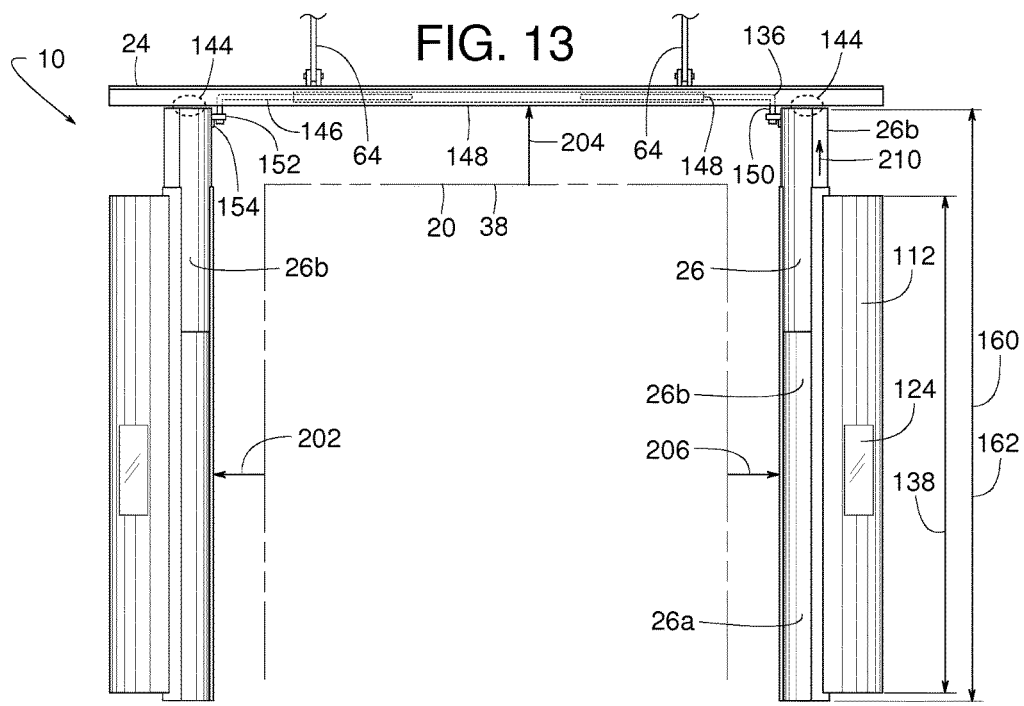

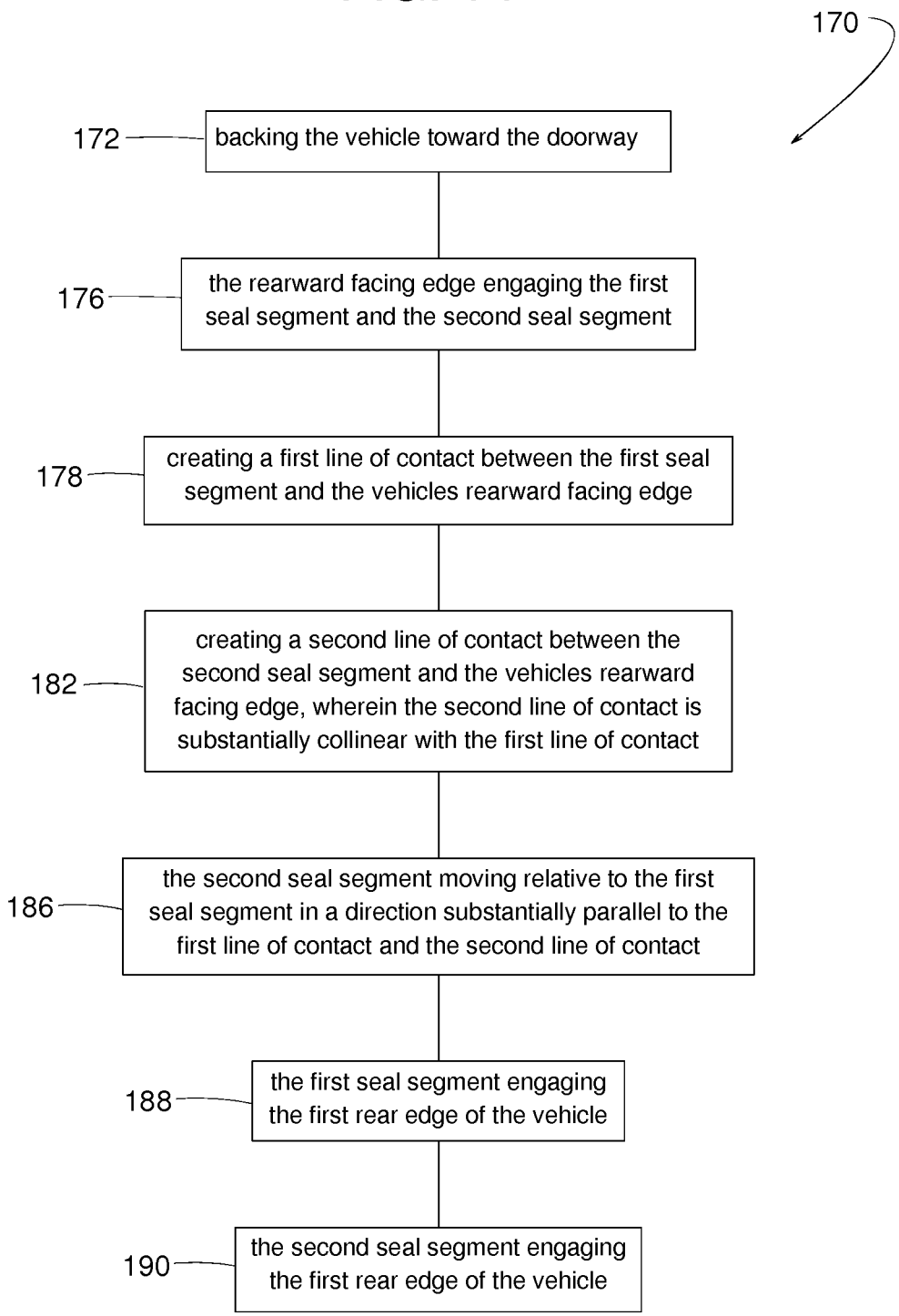

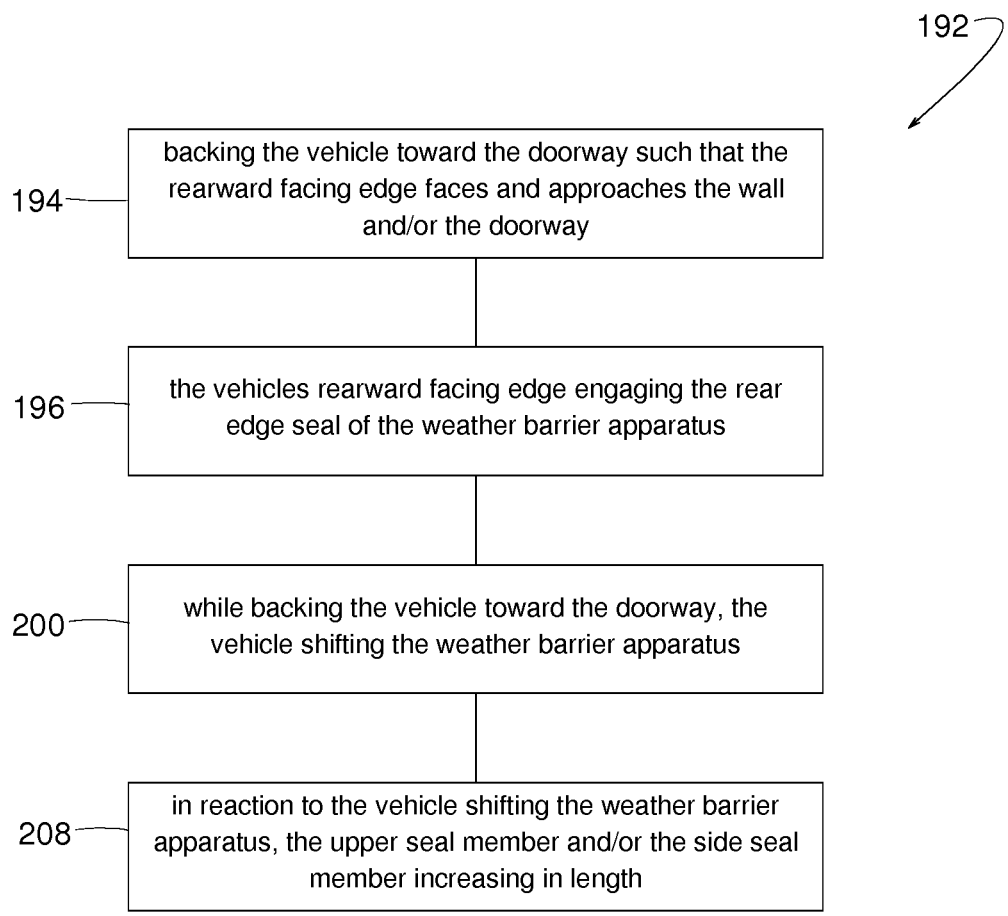

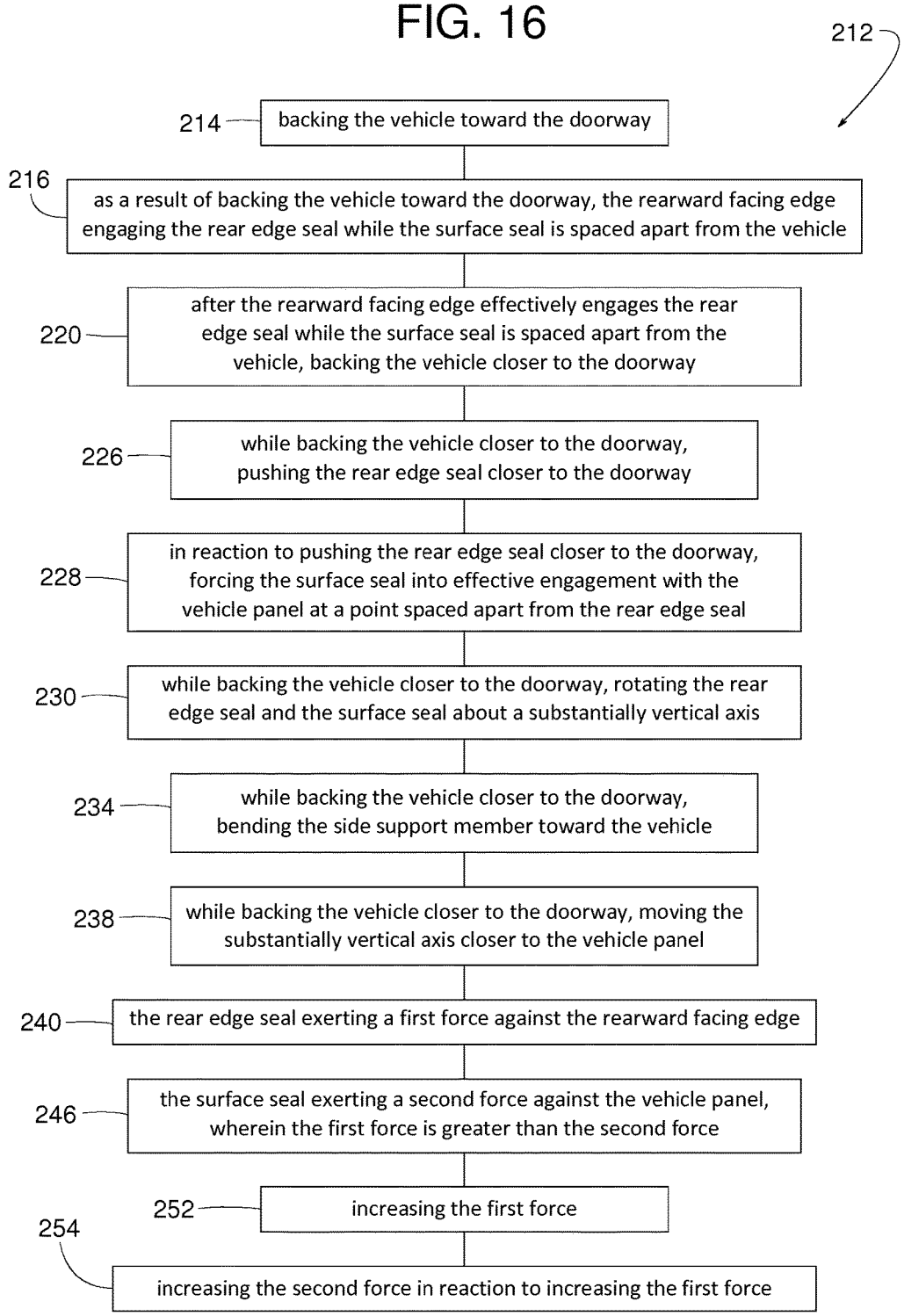

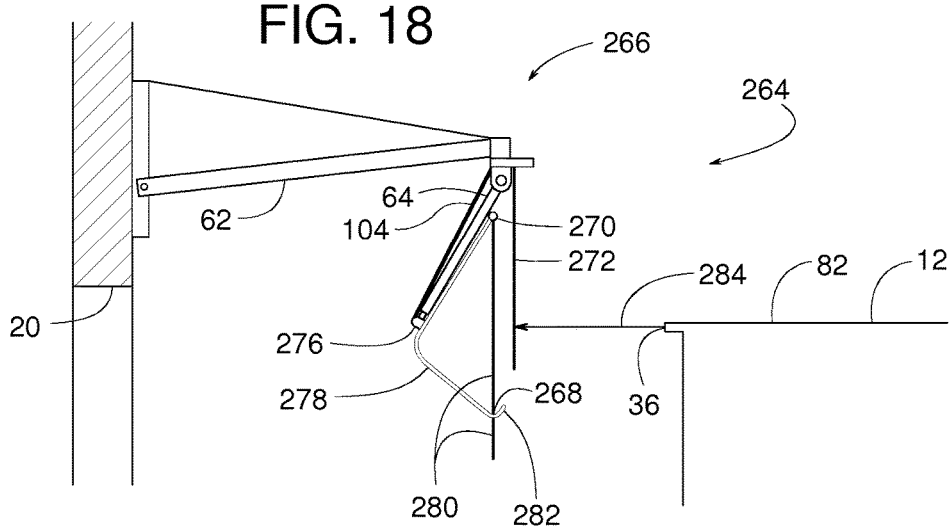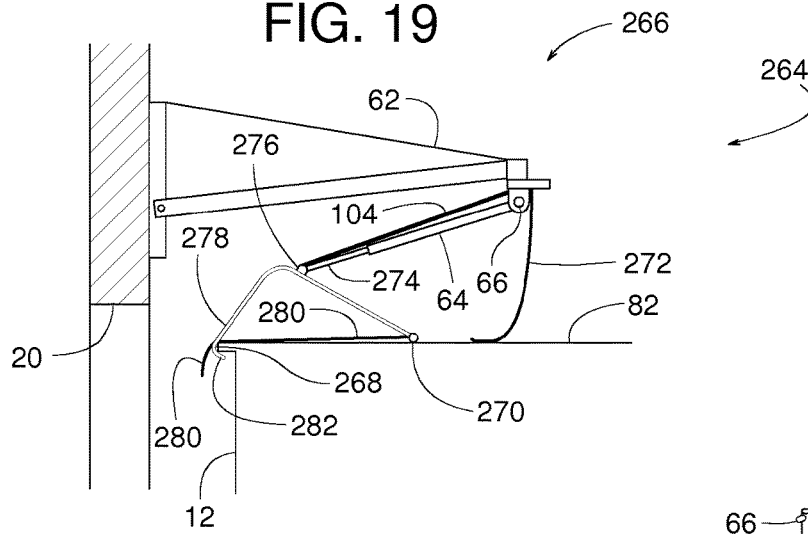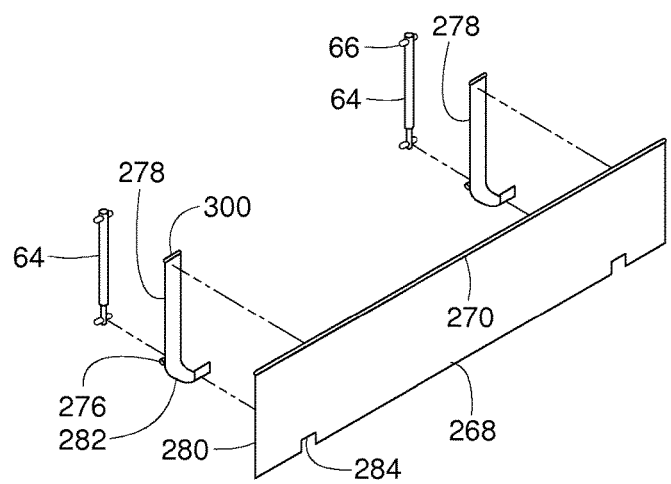

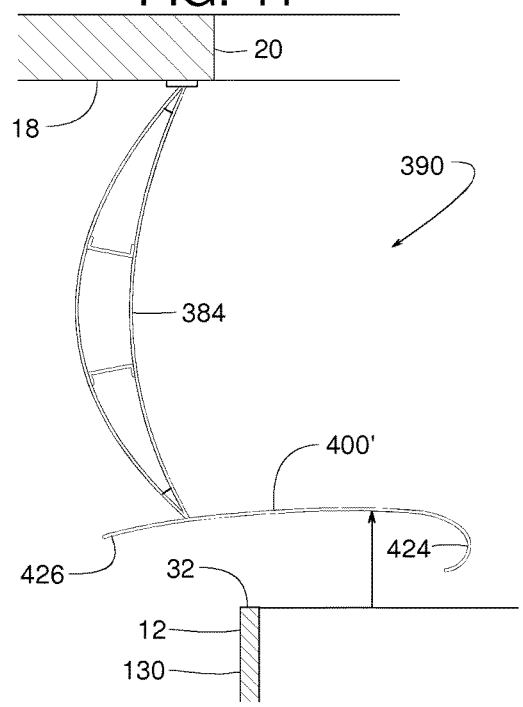
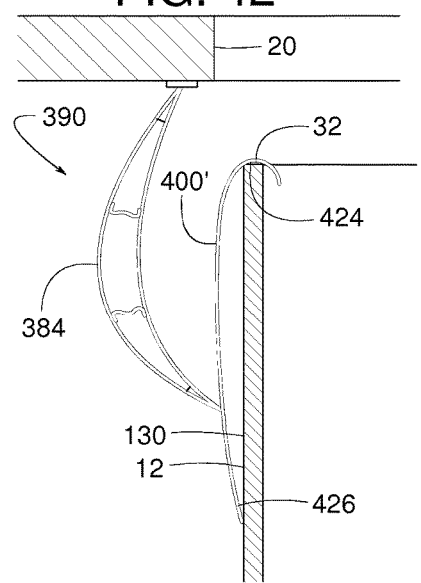
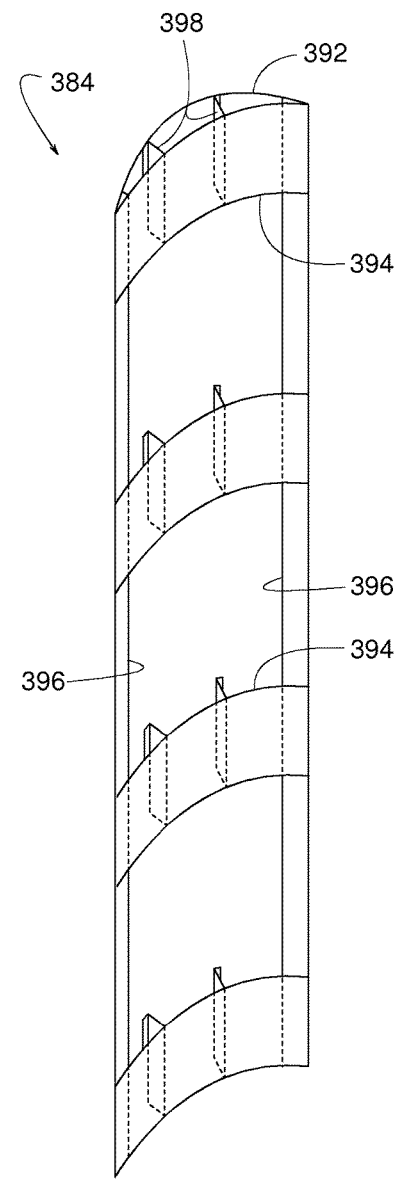

VEHICLE-ACTUATED WEATHER BARRIER APPARATUS

RELATED APPLICATIONS

This patent arises from a continuation of U.S. patent application Ser. No. 13/933,805, filed on Jul. 2, 2013, now U.S. Pat. No. 9,162,832, which is hereby incorporated herein by reference in its entirety.

FIELD OF THE DISCLOSURE

The present disclosure relates generally to vehicle-actuated members and, more specifically, to vehicle-actuated weather barrier apparatus.

BACKGROUND

Dock weather barriers (weather barrier apparatus), such as dock seals and dock shelters prevent the ingress of outdoor environmental conditions or contaminants (e.g., rain, snow, wind, hot/cold temperatures, insects, animals, etc.) into the interior of a building and/or cargo area of a vehicle during the loading or unloading of the vehicle. Dock shelters and seals also prevent the egress of conditioned air from within a building and/or a vehicle cargo area to the outdoor environment.

Some known dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between the side members along a top portion of the loading dock opening. The header structure may be another compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) is backed into either foam or inflatable dock seal side and header members, the side and header members are compressed toward the building wall to form a seal along the lateral and top back edges of the vehicle. If present, the head curtain sweeps along the top of the trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members or side curtains extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

In contrast to dock seals, dock shelters typically provide unobstructed access to a vehicle cargo area opening (i.e., there are no foam pads or the like to be compressed and displaced into the opening adjacent the rear of the vehicle). However, most known dock shelter side members are constructed using rigid wood, fiberglass or metal frames capable of supporting the weight of the seal members or side curtains, which are usually held at an appreciable distance (e.g., several feet) from the building wall. Such side members may be permanently deformed or damaged if they are impacted by a vehicle. Accordingly, bumpers or stops may be mounted to the lower edge of the dock shelter to prevent a vehicle (e.g., a truck trailer) from impacting and damaging the rigid shelter.

The rigid side members used to implement these known dock shelters are also typically mechanically coupled via the header and/or another rigid member to provide increased lateral rigidity to the dock shelter to minimize the ability of the side members to move from side-to-side. Because of this, the side members typically have to be mounted relatively far apart to accommodate a wide range of possible off-center vehicle positions relative to the opening of the building. This relatively large distance between the rigid side members consumes a significant and, thus, expensive amount of building wall space for each loading dock opening.

Some example dock shelters employ impactable side members. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover or return to its original condition or shape prior to being impacted by the vehicle.

BRIEF DESCRIPTION OF THE DRAWINGS

FIG. 6a is a cross-sectional view similar to FIG. 6 but showing the example seal return member illustrated in FIG. 3a.

FIG. 9 is a cross-sectional view taken along line 9-9 of FIG. 1.

FIG. 10 is a cross-sectional view similar to FIG. 9 but showing the vehicle at the position of initial engagement with the example weather barrier apparatus.

FIG. 12 is a front view of FIG. 1 but with the vehicle omitted to show the example weather barrier apparatus more clearly.

FIG. 13 is a front view of FIG. 2 but with the vehicle omitted to show the example weather barrier apparatus more clearly.

FIG. 14 is a block diagram illustrating an example method associated with an example weather barrier apparatus constructed in accordance with teachings disclosed herein.

FIG. 15 is a block diagram illustrating another example method associated with an example weather barrier apparatus constructed in accordance with teachings disclosed herein.

FIG. 16 is a block diagram illustrating another example method associated with an example weather barrier apparatus constructed in accordance with teachings disclosed herein.

FIG. 18 is a side view of an example weather barrier apparatus constructed in accordance with teachings disclosed herein.

FIG. 19 is a side view similar to FIG. 18 but showing a vehicle engaging the example weather barrier apparatus of FIG. 18.

FIG. 20 is a partial, exploded perspective view of the example weather barrier apparatus shown in FIGS. 18 and 19.

FIG. 41 is a top view similar to FIG. 40 but showing a vehicle engaging the example weather barrier apparatus of FIG. 40.

FIG. 42 shows a top view of an example side seal member pivotably attached to an example support member.

FIG. 43 is a perspective view of an example support member of the example weather barriers of FIGS. 38-42.

DETAILED DESCRIPTION

Figure 1:
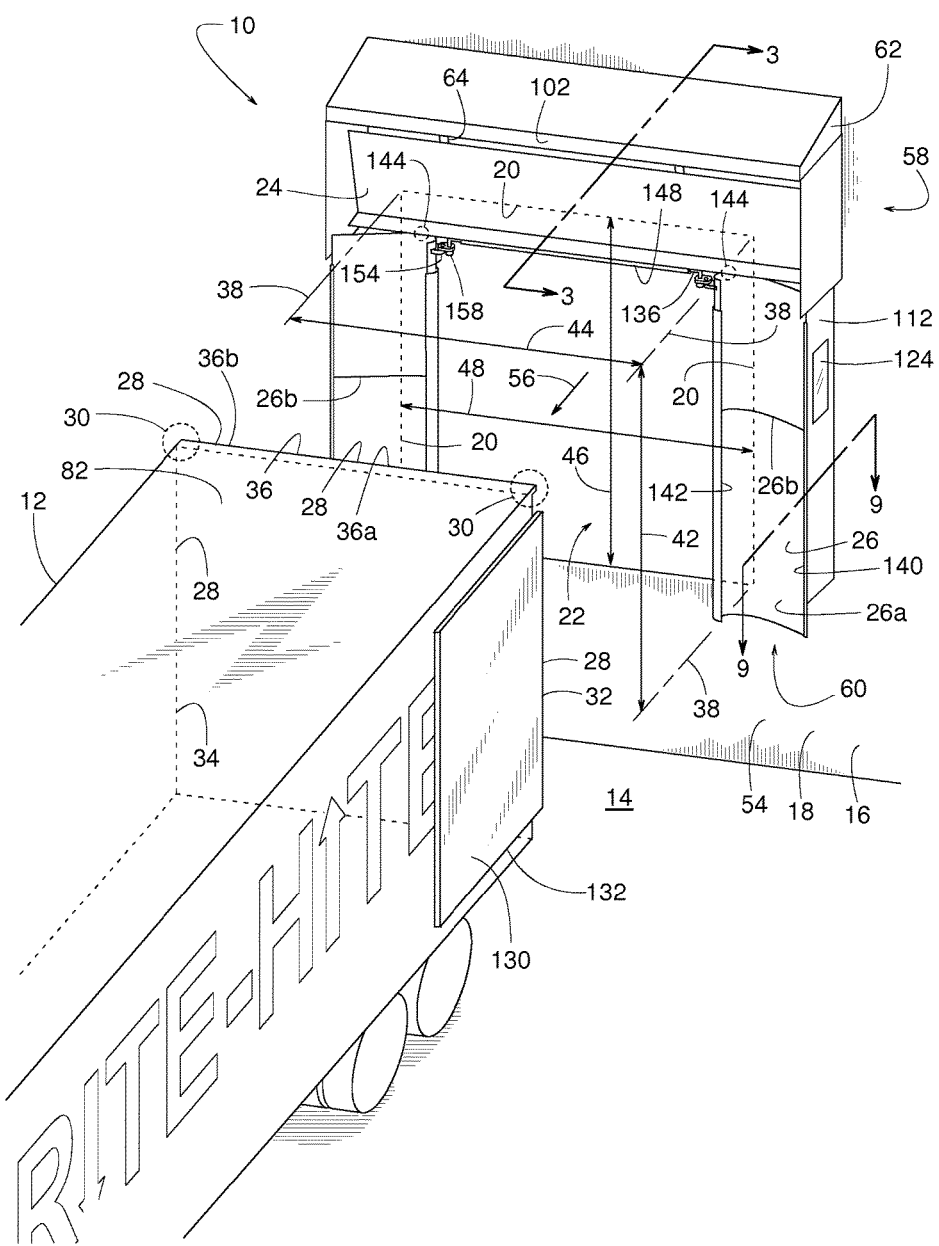
FIG. 1 is a perspective view of an example weather barrier apparatus constructed in accordance with the teachings disclosed herein. The example weather barrier apparatus of FIG. 1 is shown in a relaxed configuration and certain curtains and membranes are omitted to show other features of the weather barrier apparatus more clearly.

FIGS. 1-13 show an example weather barrier apparatus 10 constructed in accordance with the teachings disclosed herein. The example weather barrier apparatus 10 of FIGS. 1-13 has various vehicle-actuated members to seal or shelter a vehicle 12 (e.g., truck, trailer, etc.) parked at a loading dock 14 of a building 16. Building 16 includes a wall 18 and a doorway 20 through which cargo is transferred between vehicle 12 and an interior dock area 22 of building 16. In some examples, vehicle 12 backs into the weather barrier apparatus 10 in a direction toward doorway 20, vehicle 12 moves and/or lengthens at least one of an upper seal member 24 and a side seal member 26 (e.g., a first side seal member 26a and a second side seal member 26b) such that seal members 24 and 26 seek and seal the vehicle's rearward facing edge 28 and rear corners 30. Rearward facing edge 28 of vehicle 12 includes a first rear edge 32, a second rear edge 34 and an upper rear edge 36. As a result of the weather barrier apparatus 10 seeking the vehicle's rearward facing edge 28 and corners 30, the weather barrier apparatus 10 reduces (e.g., minimizes) the seal member's encroachment into and/or obstruction of a cargo passageway 38 running between doorway 20 and a rear door opening 40 (FIG. 9) of vehicle 12.

Cargo passageway 38 is defined as a projection of doorway 20, where cargo passageway 38 has a passageway height 42 and a passageway width 44 substantially equal to the doorway's height 46 and width 48, respectively. The doorway's height 46 and width 48 lie along a plane 50 (FIGS. 3 and 9) that is generally parallel to wall 18. A line 52 perpendicular to plane 50 extends substantially parallel to the general direction along which cargo travels through passageway 38. Wall 18 has an exterior surface 54 facing in a forward direction 56 parallel to line 52. The term, "plane" and "line" means that the plane and the line pertain to geometry as opposed to an actual physical structure.

Figure 2:
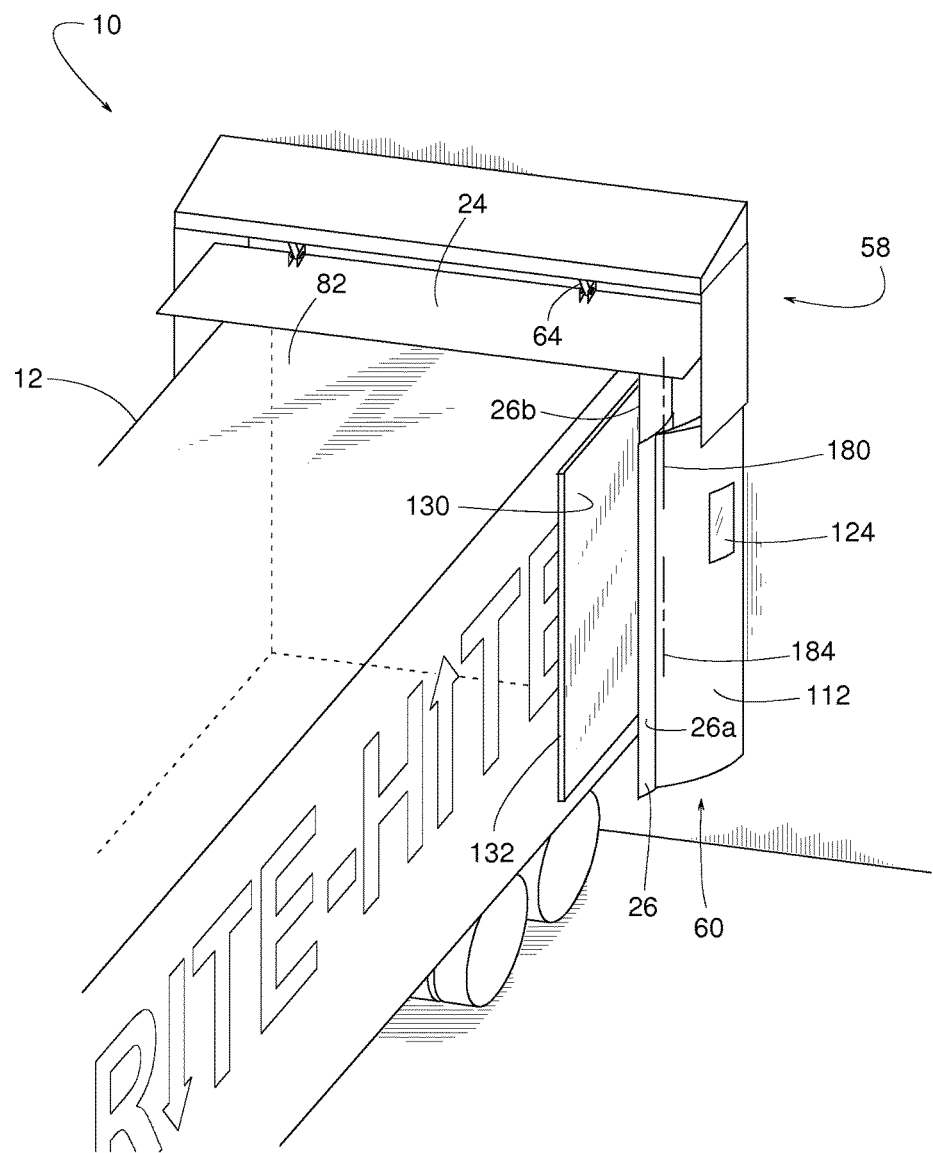
FIG. 2 is a perspective view similar to FIG. 1 but showing the weather barrier apparatus in an activated configuration.

In some examples, to seek and seal the vehicle's rearward facing edge 28 and rear corners 30, upper seal member 24 pivots relative to the side seal members 26 and/or the dock wall (e.g., in a downward direction), and side seal members 26 deflect laterally and/or lengthen vertically to accommodate the position and dimensions of vehicle 12. The movement of seal members 24 and 26 is in reaction to vehicle 12 moving from a departed position in which vehicle 12 is spaced apart from or disengaged with the weather barrier apparatus 10 (e.g., as shown in FIG. 1) to a parked position in front of doorway 20 in which vehicle 12 (e.g., fully) engages weather barrier apparatus 10 (e.g., as shown in FIG. 2). The weather barrier apparatus 10 is in a relaxed configuration when vehicle 12 is in the departed position (e.g., as shown in FIGS. 1, 3, 9 and 12). Vehicle 12 in the parked position causes or forces weather barrier apparatus 10 to an activated configuration, as shown for example in FIGS. 2, 6-8, 11 and 13.

Figure 3:
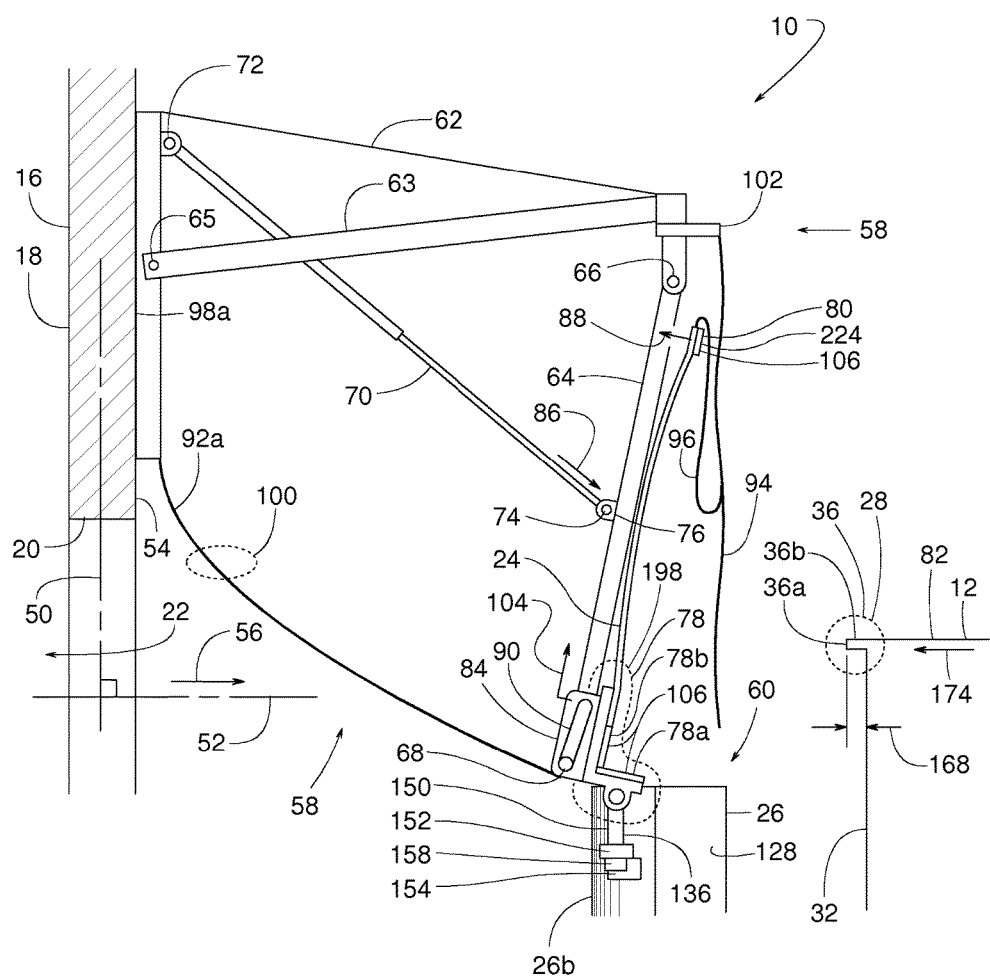
FIG. 3 is a cross-sectional view taken along line 3-3 of FIG. 1.

Although the actual structure and function of weather barrier apparatus 10 may vary, in some examples, upper seal member 24 is part of an overall header structure 58, and side seal member 26 is part of an overall side structure 60, where structures 58 and 60 are examples of vehicle-actuated weather barrier members or apparatus. In the example illustrated in FIGS. 3-8, header structure 58 includes an upper support member 62 attached to the wall's exterior surface 54, a swing arm 64 with an upper end 66 pivotally coupled to upper support member 62, upper seal member 24 being pivotally coupled to a lower end 68 of swing arm 64, and a brace 70 having one end 72 connected to upper support member 62 and an opposite end 74 connected to an intermediate point 76 on swing arm 64. To provide upper support member 62 with the ability to restorably yield, flex or resiliently deform in the event of an impact from a vehicle, some examples of upper support member 62, as shown in FIG. 3, include a frame member 63 pivotal about a pin 65. Upper seal member 24 includes an upper edge seal 78 for sealing against the vehicle's upper rear edge 36 and, in some examples, may also include an upper surface seal 80 for sealing against an upper panel 82 of vehicle 12. In some examples, a shiftable connection 84 (e.g., a slider) couples upper edge seal 78 to upper seal member's lower end 68. Shiftable connection 84 (which will be explained later in greater detail) eases the disengagement of upper edge seal 78 and upper rear edge 36 as vehicle 12 departs dock 14 and disengages from weather barrier apparatus 10.

An example operation of header structure 58 follows the example sequence illustrated in FIGS. 3-8. FIG. 3 shows vehicle 12 in the departed or disengaged position backing toward header structure 58. During the approach, vehicle 12 is separated or disengaged from weather barrier apparatus 10 and header structure 58 such that weather barrier apparatus 10 is in the relaxed configuration (e.g., an initial position) with upper seal member 24 being in a lowered or stored position. In the relaxed configuration, swing arm 64 hangs downward to a forward position due to the swing arm's weight, the weight of upper seal member 24 and/or the force of brace 70 pushing or biasing swing arm 64 to the forward position (e.g., biasing the lower end 68 of swing arm 64 away from the wall 18). In some examples, brace 70 includes a spring 86 that urges swing arm 64 to the forward position. Spring 86 is schematically illustrated to represent any resilient member being part of or coupled to brace 70. In some examples, spring 86 is provided by brace 70 itself being a pneumatic spring.

Some examples of header structure 58 include a spring 88 urging upper seal member 24 to the generally upright position, as shown in FIG. 3. Spring 88 is schematically illustrated to represent any resilient member (e.g., extension spring, compression spring, pneumatic spring, leaf spring, elastic cord, etc.) that urges upper seal member 24 to the generally upright position. In the illustrated example, spring 88 urges upper seal member 24 to rotate (e.g., upwards) about the swing arm's lower end 68 toward the wall 18. In some examples, the swing arm's lower end 68 is an element that slides, shifts, moves or otherwise travels along respective ends of a slot 90 in shiftable connection 84. In some examples, the element is a pin protruding (e.g., laterally) into slot 90.

Figure 3A:
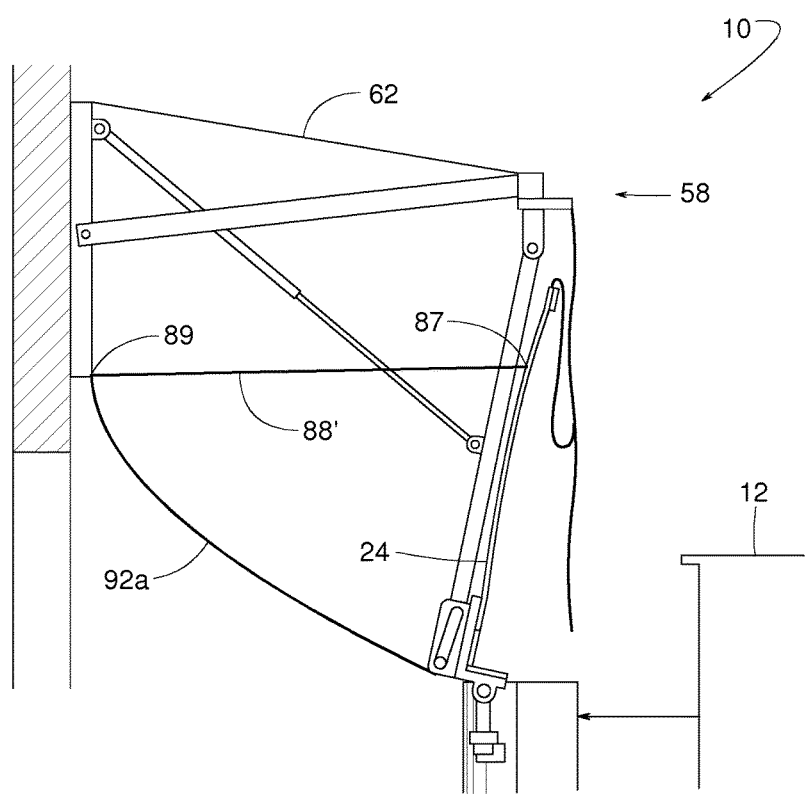
FIG. 3a is a cross-sectional view similar to FIG. 3 but showing an example seal return member constructed in accordance with the teachings disclosed herein.
Figure 6:
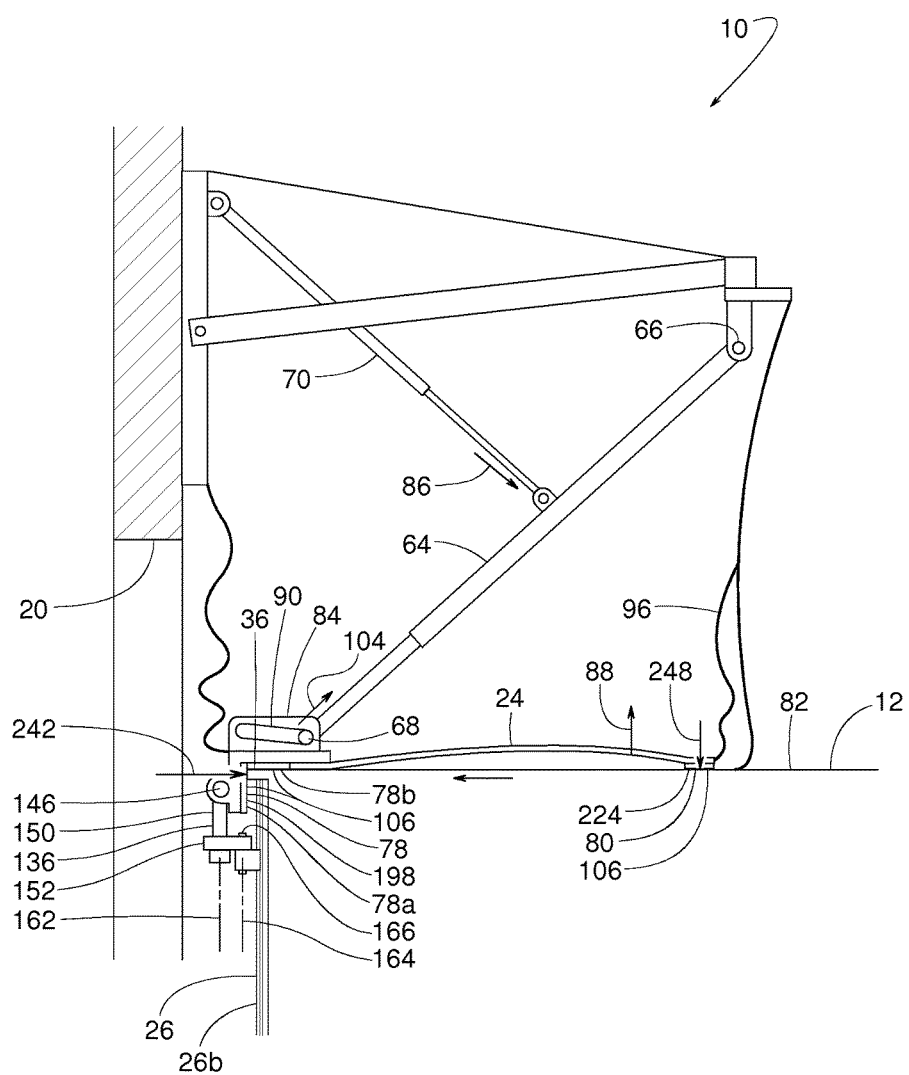
FIG. 6 is a cross-sectional view similar to FIGS. 3-5 but showing the vehicle at a parked position and the weather barrier apparatus in an activated configuration.
Figure 6A:
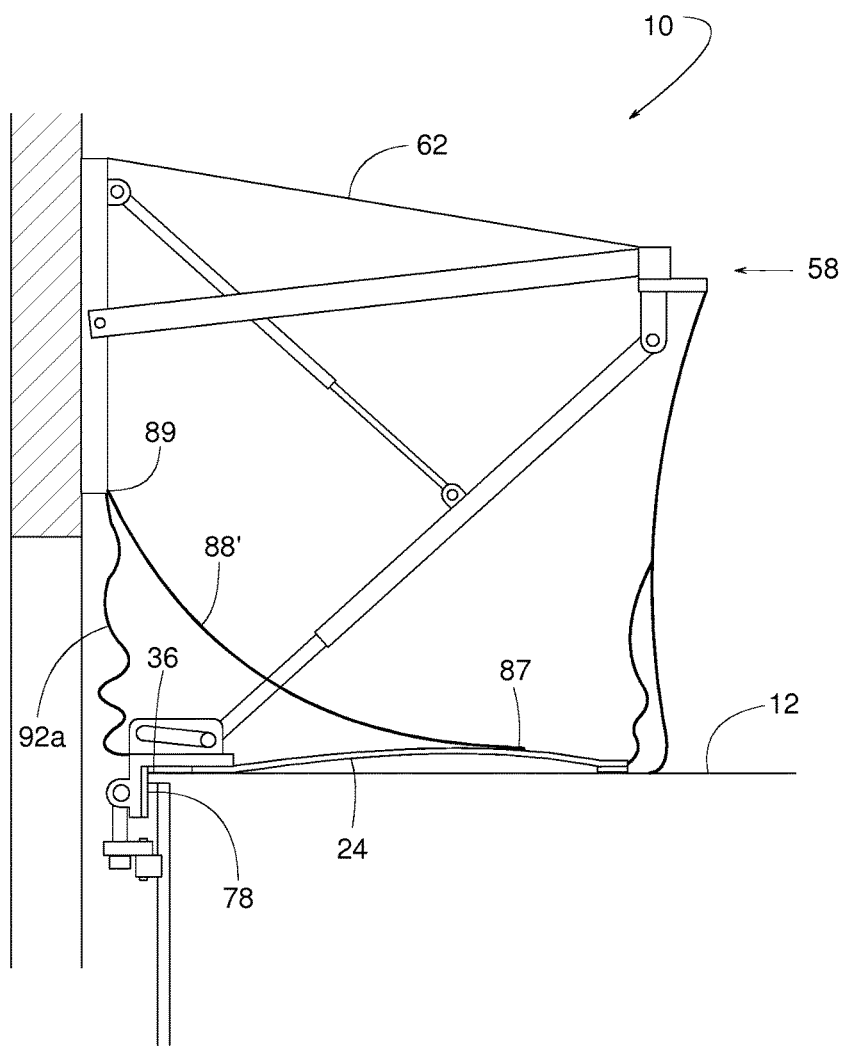

In addition or as an alternative to spring 88, some examples of header structure 58 include a seal return member 88' in the form of a pliable elongate member of fixed length extending between one point 87 on upper seal member 24 and an anchor point 89 near the lower end of upper support member 62. Examples of seal return member 88' include, but are not limited to, a strap, a sheet of pliable material, a cable, a chain, a rope, etc. When weather barrier apparatus 10 is in the relaxed configuration, as shown in FIG. 3a, the linear distance between points 87 and 89 makes seal return member 88' substantially taut such that seal return member 4 pulls upper seal member 24 to its upright position. When weather barrier apparatus 10 is in the activated configuration, as shown in FIG. 6a, the distance between points 87 and 89 is less than the overall length of seal return member 88', whereby seal return member 88' becomes slack, which allows upper seal member 24 to descend upon vehicle 12.

For greater sealing integrity, some examples of header structure 58 include at least one of a pliable membrane 92a, a front curtain 94 and a back membrane 96. Pliable membrane 92a, in some examples, extends from upper seal member 24 to a peripheral region 98a of doorway 20 to span an overhead gap 100 that might otherwise exist between seal member 24 and wall 18. Front curtain 94, in some examples, hangs from a front edge 102 of upper support member 62 and helps seal gaps that might exist between upper support member 62 and the vehicle's upper panel 82. Back membrane 96, in some examples, extends between upper seal member 24 and front curtain 94 to help seal gaps that might exist in that area. In some examples, each of membranes 92a, 94 and 96 are made of a pliable sheet of material. The term, "pliable" as it relates to a sheet of material means that the material is sufficiently flexible to be folded over onto itself without experiencing significant permanent deformation when subsequently unfolded.

Figure 4:
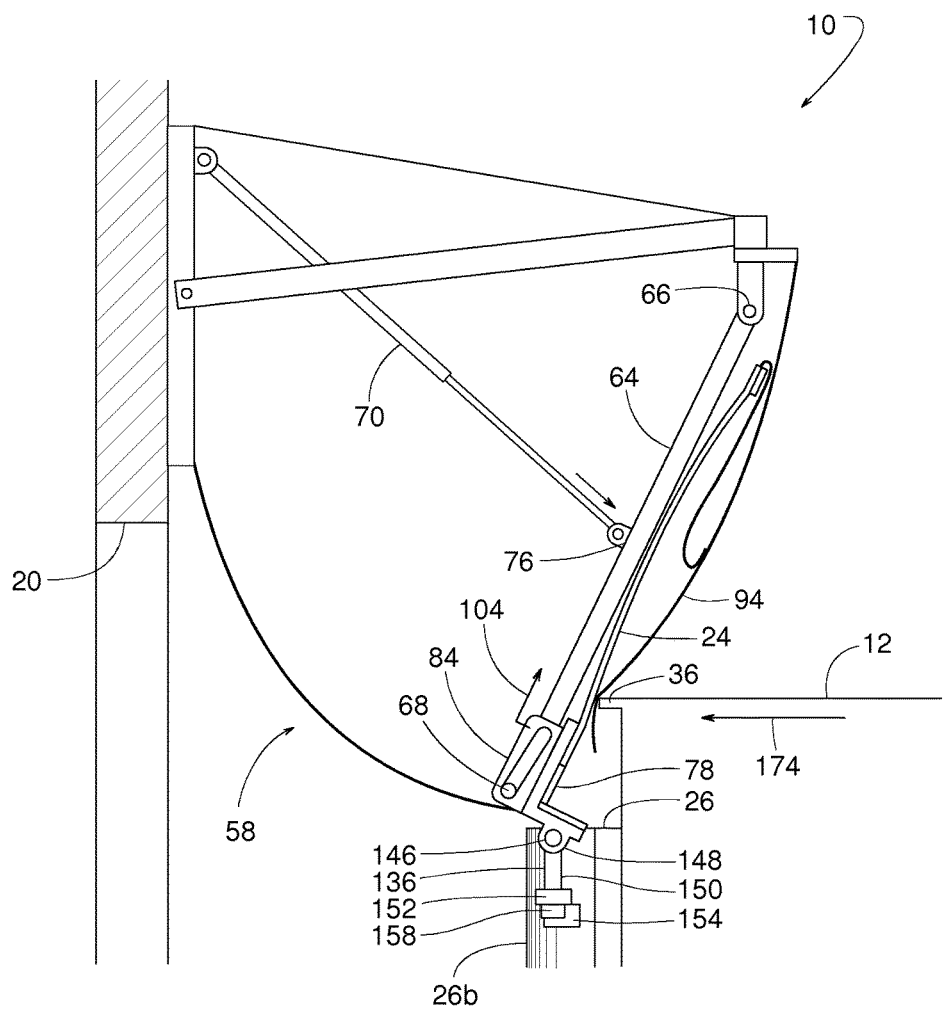
FIG. 4 is a cross-sectional view similar to FIG. 3 but showing an example vehicle at a position of initial engagement with the example weather barrier apparatus.

FIG. 4 shows the initial movement or reaction of weather barrier apparatus 10 as the vehicle's upper rear edge 36 first engages header structure 58. During initial contact, the vehicle's upper rear edge 36 effectively engages upper seal member 24. The term, "effectively engages" (and derivatives thereof) as used with reference, for example, to a seal member effectively engaging a vehicle means that the seal member either touches the vehicle directly or with some intermediate element (e.g., a curtain membrane) interposed in compression between the seal member and the vehicle. In the illustrated example of, "the vehicle's upper rear edge 36 effectively engages upper seal member 24," this means that engagement occurs but with front curtain 94 sometimes being interposed in compression between edge 36 and upper seal member 24. During initial engagement, vehicle 12 pushes upper seal member 24 and swing arm 64 (e.g., the lower end 68) back toward doorway 20 about the pivot 66 of the swing arm 64. The vehicle's pushing force overcomes the spring force of brace 70 applied to the swing arm's 64 intermediate point 76. As a result, vehicle 12 forces upper seal member 24 and swing arm 64 to rotate about the upper end 66 of swing arm 64. Vehicle 12 eventually pushes swing arm 64 to its deflected position shown in FIG. 6 as vehicle 12 continues to move toward the doorway 20.

Figure 5:
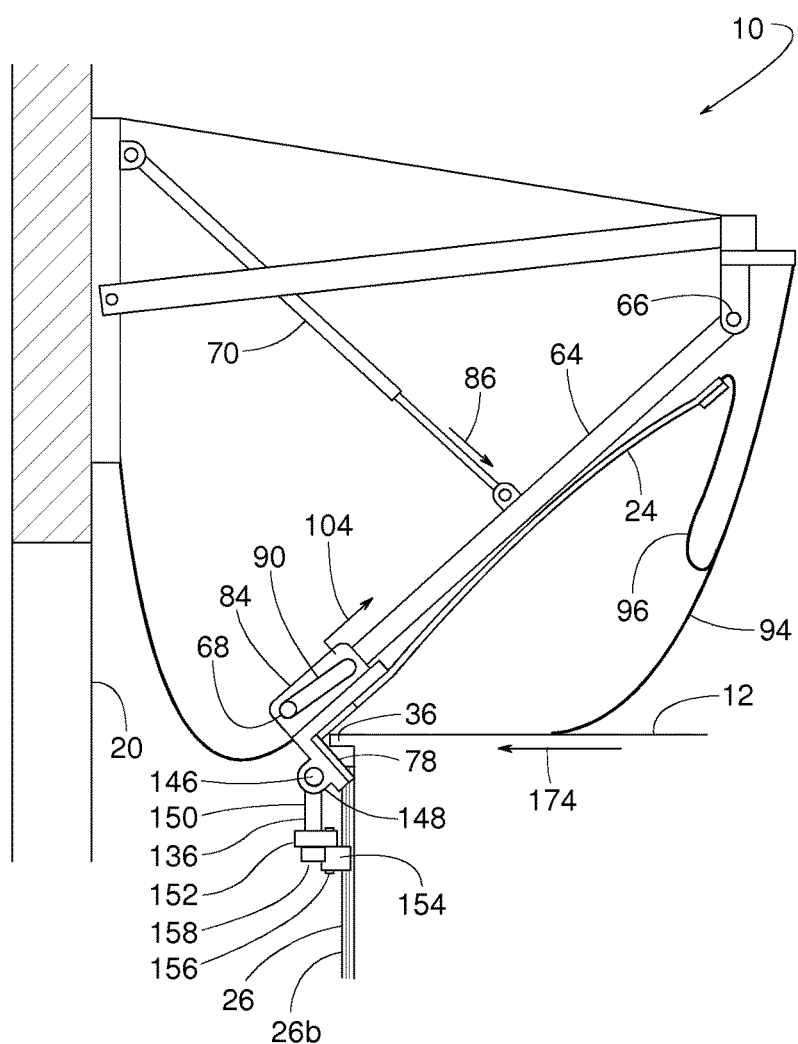
FIG. 5 is a cross-sectional view similar to FIGS. 3 and 4 but showing the vehicle further into engagement with the example weather barrier apparatus.

In the illustrated example, vehicle 12 continues to move back toward doorway 20 from the position shown in FIG. 4 to an intermediate position shown in FIG. 5. In doing so, the vehicle's upper rear edge 36 slides along upper seal member 24 until the vehicle's upper rear edge 36 engages upper edge seal 78, thereby placing weather barrier apparatus 10 in an intermediate configuration, as shown in FIG. 5. From the position shown in FIG. 5, vehicle 12 continues moving back toward wall 18 to the position shown in FIG. 6. In FIG. 6, vehicle 12 is shown in the parked position (e.g., a loading/unloading position) with weather barrier apparatus 10 in an activated configuration and upper seal member 24 in a raised or sealing position. As vehicle 12 moves back toward the doorway 20 from the position shown in FIG. 5 to that shown in FIG. 6, several things happen.

One, the rearward force that vehicle 12 exerts against upper seal member 24 coupled with the force that spring 86 exerts against swing arm 64 causes upper seal member 24 and shiftable link 84 to rotate (e.g., squarely) against the vehicle's upper rear edge 36. Upper rear edge 36 is a general region of vehicle 12, where upper rear edge 36, more specifically, includes a rear portion 36a and a top portion 36b (FIG. 3). Rear portion 36a generally faces toward doorway 20, and top portion 36b faces generally upward. The rotation of upper seal member 24 rotates upper seal member 24 downward toward the vehicle's upper panel 82. This places upper surface seal 80 of upper seal member 24 in effective engagement with upper panel 82. In some examples, upper surface seal 80 engages upper panel 82 directly, and in other examples, a lower end of front curtain 94 is (e.g., compressively) interposed between upper surface seal 80 and upper panel 82.

Two, vehicle 12 pushing upper seal member 24 and shiftable connection 84 back while brace 70 attempts holding the swing arm's lower end 68 stationary causes relative sliding motion between the swing link's lower end 68 and shiftable connection 84. The relative sliding motion moves the swing link's lower end 68 to the front end of the shiftable connection's slot 90 (e.g., pin or lower end 68 moves or slides from one end of slot 90 to the other end of slot 90).

Three, after the swing link's lower end 68 reaches the forward end of travel within slot 90, vehicle 12 continues pushing upper edge seal 78 and shiftable connection 84 back toward doorway 20. In some examples, swing arm 64 is extendable (e.g., telescopic). As a result, vehicle 12 continued push of upper edge seal 78 and shiftable connection 84 back toward doorway 20 forces swing arm 64 to extend in opposition to a spring or biasing element 104 associated with swing arm 64 and shiftable connection 84. Spring 104 is schematically illustrated to represent any means for urging swing arm 64 to the retracted position (e.g., a position providing a minimum length) and/or for urging shiftable connection 84 toward the swing arm's upper end 66. Examples of spring 64 include, but are not limited to, an extension spring, a compression spring, a pneumatic spring, a leaf spring, an elastic cord, etc. In some examples, spring 104 is an extension spring positioned within or inside a housing of swing arm 64 with opposite ends of spring 104 being connected to the swing arm's upper end 66 and shiftable connection 84. In some examples, spring 104 is an extension spring on the exterior of swing arm 64 with opposite ends of spring 104 being connected to the swing arm's upper end 66 and shiftable connection 84.

With vehicle 12 in the parked position and weather barrier apparatus 10 in the activated configuration, as shown in FIGS. 6 and 6a, upper edge seal 78 effectively engages and seals against the vehicle's upper rear edge 36. In addition or alternatively, in some examples, upper surface seal 80 effectively engages and seals against the vehicle's upper panel 82. In some examples, upper edge seal 78 includes a catch 78a and/or a foot 78b. In some examples, catch 78a effectively engages and seals against rear portion 36a of the vehicle's upper rear edge 36. In some examples, catch 78a effectively engages but does not necessarily seal against rear portion 36a. In some examples, foot 78b effectively engages and seals against top portion 36b of the vehicle's upper rear edge 36. In some examples, foot 78b effectively engages but does necessarily seal against top portion 36b of the vehicle's upper rear edge 36.

To enhance sealing, some examples of foot 78b, catch 78a and upper surface seal 80 include a sealing element 106 that compliantly seals against the vehicle's upper rear edge 36 and/or upper panel 82. Sealing element 106 is schematically illustrated to represent any compliant feature that promotes or effects sealing. Examples of sealing element 106 include, but are not limited to, a rubber pad, a foam pad, a gasket, one or more lips of flexible strips of material, flexible pleats, and a sheet of flexible material formed to create a compressible bulb or loop, etc.

Figure 7:
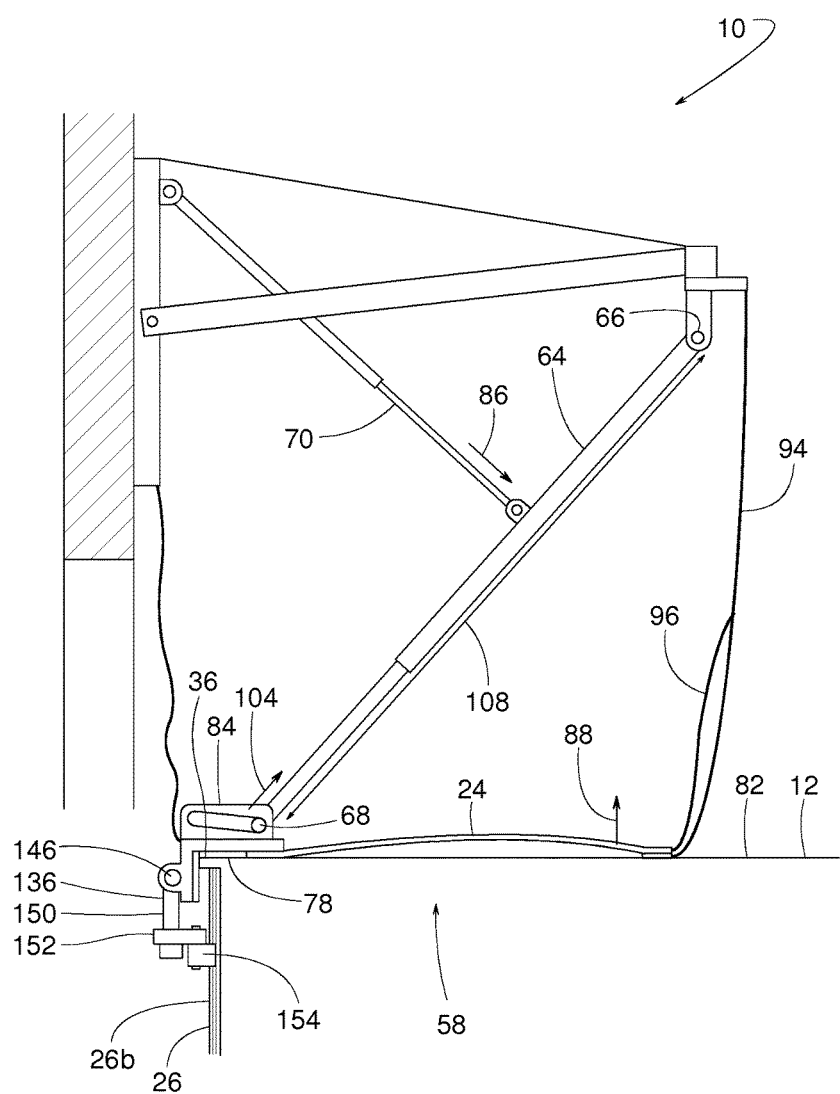
FIG. 7 is a cross-sectional view similar to FIG. 7 but showing the vehicle at a lower position.

FIG. 7 shows the configuration of header structure 58 when the vehicle's upper panel 82 is lower than the position of the upper panel 82 shown in FIG. 6. For example, the upper panel 82 may move to a lower position relative to doorway 20 when heavy cargo and/or a forklift enter the cargo bay of vehicle 12. In other cases, instead of vehicle 12 being positioned at the height shown in FIG. 6, a vehicle having a smaller overall height might enter dock 14. When the vehicle's upper panel 82 descends or is otherwise at a lower position as shown in FIG. 7, brace 70 under spring force extends toward swing arm 64 to hold upper edge seal 78 (e.g., downward) in engagement against the vehicle's upper rear edge 36. Swing arm 64 having a variable length 108 provides upper edge seal 78 with a freedom of travel (e.g., vertical travel) that allows upper edge seal 78 to follow the vertical movement of the vehicle's upper rear edge 36.

Figure 8:
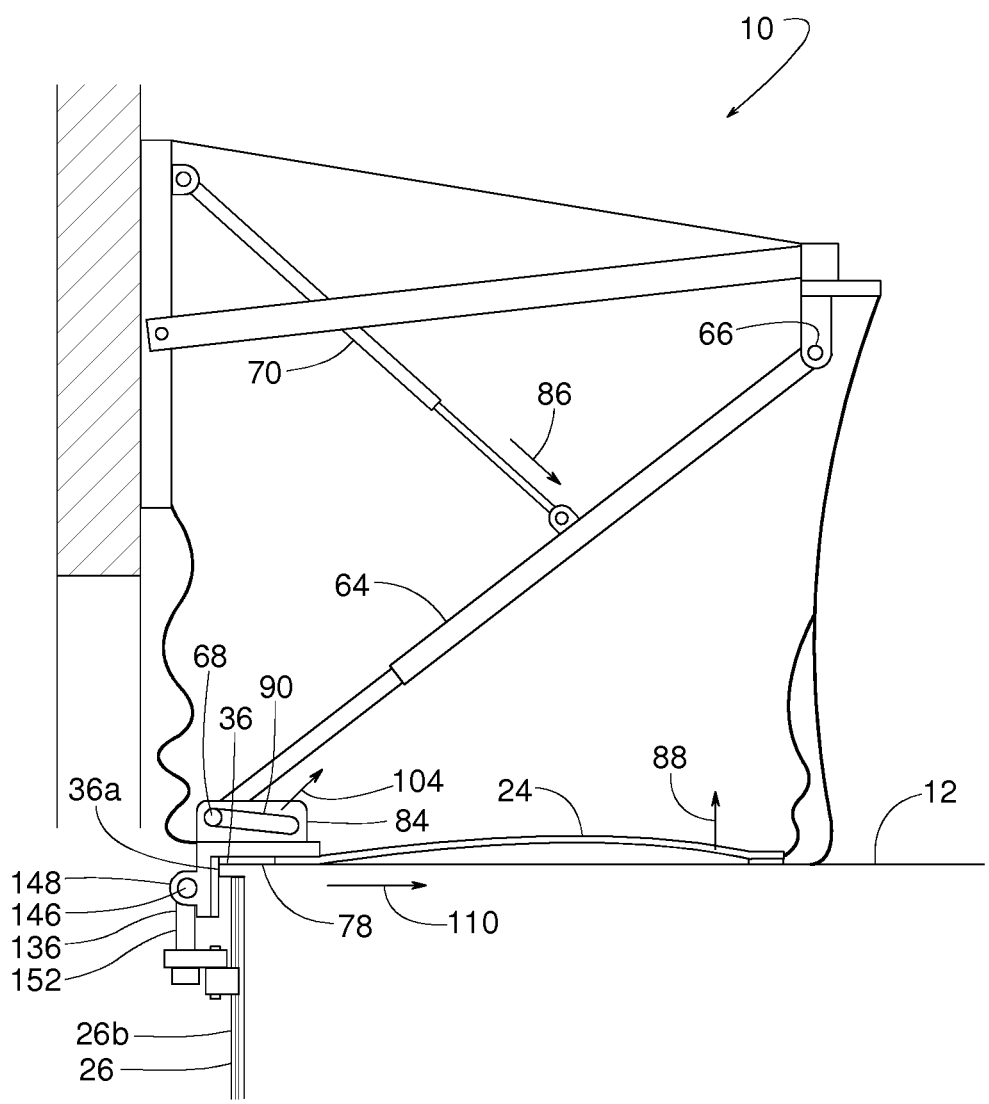
FIG. 8 is a cross-sectional view similar to FIG. 6 but showing the vehicle departing a loading dock and showing the example weather barrier apparatus in a departing activated configuration.

After loading or unloading vehicle 12 and vehicle 12 begins departing dock 14, as shown in FIG. 8, the vehicle's initial forward movement 110 away from doorway 20 causes rear edge seal 78 and shiftable connection 84 to move forward as well. Lost motion of the brace's lower end 68 relative to shiftable connection 84 shifts lower end 68 to the back end of slot 90 (i.e., causes lower end 68 to move between the forward and rearward ends of the slot 90), as shown in FIG. 8. Although FIGS. 6 and 8 show weather barrier apparatus 10 in the activated configuration, FIG. 6 shows weather barrier apparatus 10 in an arriving activated configuration, and FIG. 8 shows weather barrier apparatus 10 in a departing activated configuration. Spring 104 acting upon shiftable connection 84 urges weather barrier apparatus 10 to the departing activated configuration. The shifting motion at shiftable connection 84 positions the brace's lower end 68 near or behind the rear portion 36a of the vehicle's upper rear edge 36, so upper seal member 24 readily "falls off" or disengages upper rear edge 36 as vehicle 12 departs and moves away from doorway 20. In some examples, to prevent a similar releasing action as vehicle 12 vacillates vertically and/or back-and-forth during loading and unloading operations, slot 90 is at a slight incline to bias the brace's bottom end 68 toward the forward end of slot 90.

Header structure 58 can be used alone or with various types of side sealing structures. Referring to FIGS. 1 and 2 and further to FIGS. 9-11, some examples of side structure 60 include a side support member 112 attached to wall 18, side seal member 26 pivotally attached to side support member 112, and, in some examples, a pliable membrane 92b extending from side seal member 26 to a peripheral region 98b of doorway 20. Pliable membrane 92b spans a lateral gap 114 that might otherwise exist between side seal member 26 and peripheral region 98b.

In the illustrated example, side support member 112 comprises two flexible panels 116 spaced apart at a mounting base 118 and converge or come together at an apex 120 where side seal member 26 connects to side support member 112. Apex 120 is at a vertically extending pivotal axis 122 about which side seal member 26 pivots relative to side support member 112. In some examples, a flexible fabric lap joint at apex 120 pivotally connects side seal member 26 to side support member 112. In some examples, resiliently compressible foam fills the space between panels 116. In some examples, side support member 112 is hollow between panels 116. In some examples, side support member 112 includes a window 124.

Figure 11:
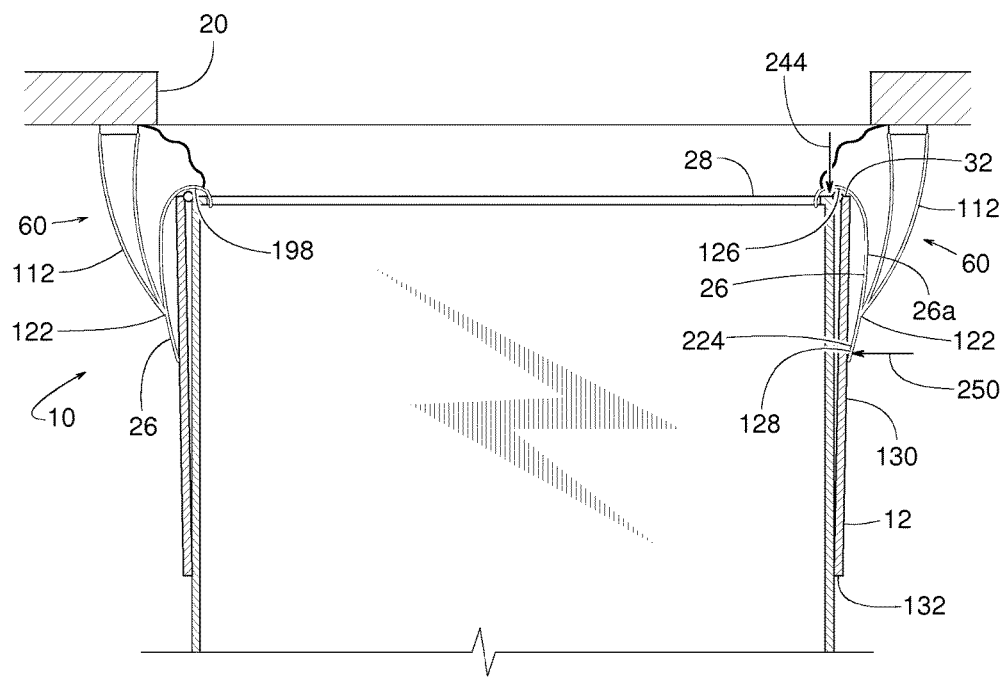
FIG. 11 is a cross-sectional view similar to FIGS. 9 and 10 but showing the vehicle at the parked position with the example weather barrier apparatus in the activated configuration.

Side seal member 26, in some examples, includes a side edge seal 126 and/or a side surface seal 128, where pivotal axis 122 lies between seals 126 and 128. When vehicle 12 is in the parked position and weather barrier apparatus 10 is in the activated configuration, side support member 112 responds by bending toward vehicle 12 such that side edge seal 126 effectively engages rear edge 32 and side surface seal 128 engages a side panel 130 of vehicle 12, as shown in FIG. 11. The bending motion of side support member 112 positions pivotal axis 122 closer to vehicle 12 when vehicle 12 is at the parked position (FIG. 11) than when vehicle 12 is at the departed position (FIG. 9) or at the intermediate position (FIG. 10). Side panel 130 is any vehicular surface that is approximately vertical and facing in a direction that is approximately perpendicular to line 52. Examples of side panel 130 include, but are not limited to, the side of vehicle 12 (e.g., where the vehicle has a rear door that operates vertically) and a side (e.g., an inner surface) of a swung-open rear door panel 132 of vehicle 12 (e.g., door panel 132 being hinged to the vehicle's rearward facing edge 28).

An example operation of side structure 60 follows the example sequence illustrated in FIGS. 9-11. FIG. 9 shows vehicle 12 in the departed position backing or moving toward side structure 60. During this approach, vehicle 12 is separated from weather barrier apparatus 10 and side structure 60, and so weather barrier apparatus 10, as shown in FIG. 9, is in the relaxed configuration and side seal member 26 is in the preparatory or stored position. In the relaxed configuration, side seal member 26 is biased to position side edge seal 126 within cargo passageway 38.

FIG. 10 shows the vehicle's initial contact with side seal member 26 as vehicle 12 moves toward doorway 20. In this example, the vehicle's rear edge 32 engages side seal member 26 along a generally vertical line or area of contact 134 between side edge seal 126 and pivotal axis 122. From the position shown in FIG. 10, as vehicle 12 continues moving back toward doorway 20, side seal member 26 and side support member 112 deflect, as shown in FIG. 11.

FIG. 11 shows vehicle 12 at the parked position with weather barrier apparatus 10 in the activated configuration (e.g., vehicle 12 is positioned for loading/unloading operation). In the activated configuration, side edge seal 126 effectively engages the vehicle's rear edge 32, and in some examples, side surface seal 128 effectively engages the vehicle's side panel 130. Side structure 60 can be used alone and/or with various types of header structures. In some examples, side structure 60 can be configured (e.g., positioned horizontally) and used as a header structure, where side structure 60 is generally horizontally elongate and installed above doorway 20. In some examples, header structure 58 can be configured (e.g., turned upright) and used as a side structure, where header structure 58 is generally vertically elongate and installed on either side of doorway 20.

In some examples where weather barrier apparatus 10 includes both header structure 58 and side structure 60, as shown in FIGS. 1-8, a coupling 136 between seal members 24 and 26 coordinates the vertical pivotal motion of upper seal member 24 with vertical lengthening or sliding (e.g., vertical positioning) of side structure 60. Coupling 136 in combination with side structure 60 being vertically extendable enables the seal members 24 and 26 of weather barrier apparatus 10 to seek and seal against the vehicle's rearward facing edges 28 and corners 30 with minimal obstruction of cargo passageway 38.

To render side structure 60 vertically extendable, some examples of side seal member 26 include a lower side seal segment 26a connected to an upper side seal segment 26b such that one segment can move, shift or slide vertically relative to the other segment. In some examples, as shown in FIGS. 1, 12 and 13, lower side seal segment 26a is pivotally attached to side support member 112, and both are of a fixed vertical length (e.g., side support member 112 has a substantially constant vertical length 138 as shown in FIG. 12). Upper side seal segment 26b is nested within lower side seal segment 26a. Upper side seal segment 26b can slide vertically along lower side seal segment 26a while upper side seal segment 26b is constrained laterally between edges 140 and 142 of lower side seal segment 26a. In some examples, an upper side seal segment similar in function to upper side seal segment 26b is attached to the back face of lower side seal segment 26a. Such back-mounted upper side seal segments include guide rods, a vertical slit and/or other features for accommodating the pivotal connection (at axis 122) between side support member 112 and the backside of lower side seal segment 26a.

Coupling 136 helps hold side edge seal 126 adjacent to upper edge seal 78 at a corner region 144 of weather barrier apparatus 10. Coupling 136 maintains edge seals 78 and 126 in closest proximity at corner region 144 regardless of whether barrier apparatus 10 is in the relaxed or activated configuration. Corner region 144 is the area of weather barrier apparatus 10 that moves into position to seal the general area of the vehicle's upper rear corners 30. Specifically, in some examples, corner region 144 is at a first location (FIG. 12) when weather barrier apparatus 10 is in the relaxed configuration, and corner region 144 is at a second location (FIG. 13) when weather barrier apparatus 10 is in the activated configuration. In other words, the example corner region 144 moves in a first direction (e.g., a vertical direction) and a second direction (e.g., a horizontal direction) different than the first direction when vehicle 12 engages and disengages the weather barrier apparatus 10. For example, in the illustrated example, the first location is within or adjacent cargo passageway 38 and the second location is higher than the first location such that the second location is further away from the cargo passageway 38. Upper edge seal 78 at the second location is interposed between doorway 20 and vehicle 12 when vehicle 12 is at the parked position, and side edge seal 126 at the second location is interposed between doorway 20 and vehicle 12 when vehicle 12 is at the parked position.

To achieve such function, in some examples, coupling 136 is generally L-shaped with a first leg 146 that is horizontally elongate and slides lengthwise within a tube 148 that is attached directly or indirectly to upper seal member 24. Tube 148 provides an axially slidable connection between first leg 146 and upper seal member 24. The axially slidable connection enables weather barrier apparatus 10 to accommodate vehicles of various widths. In some examples, the axially slidable connection also provides a rotatable connection between first leg 146 and upper seal member 24. First leg 146 being able to rotate within tube 148 enables weather barrier apparatus 10 to move through the various positions shown in FIGS. 3-6. In this example, coupling 136 has a second leg 150 that is vertically elongate and points downward. A pivotal link 152 connects second leg 150 to a lug 154 protruding from upper side seal segment 126b. A pin 156 pivotally connects pivotal link 152 to lug 154, and a head 158 on the lower end of second leg 150 holds pivotal link 152 engaged to second leg 150. With this arrangement, upper side seal segment 26b hangs suspended from upper seal member 24, whereby header structure 58 carries at least some weight of upper side seal segment 26b.

As vehicle 12 backs into weather barrier apparatus 10 and pushes upper seal member 24 upward, coupling 136 pulls upper side seal segment 26b up with it such that rear edge seal 78 and upper side seal segment 26b rise together. Thus, side seal member 26 lengthens while the length of side support member 112 stays constant. Due to side seal member 26 having an adjustable vertical length 160, side structure 60 has a variable overall length 162 that is significantly greater in the activated configuration (FIG. 13) than in the relaxed configuration (FIG. 12). The expression, "a variable overall length that is significantly greater in the activated configuration than in the relaxed configuration," means, in some examples, that the variable overall length is at least 6 inches greater in the activated configuration than in the relaxed configuration and that the change in length is not merely the result of inconsequential expansion or distortion due to inflation or foam compression.

As vehicle 12 backs into weather barrier apparatus 10, coupling 136 also allows side edge seal 126 to move laterally outward (to seek the vehicle's vertical rear edges 32 and 34) while maintaining side edge seal 126 and upper edge seal 78 in proximity with each other at corner region 144. The coupling's leg 146 sliding within tube 148 allows coupling 136 to follow the lateral movement of side edge seal 126.

In examples where pivotal coupling 136 includes pivotal link 152, as opposed to leg 150 being pivotally connected to lug 154 directly, pivotal link 152 provides offset pivotal axes 162 and 164, where second leg 150 defines first axis 162 and pin 166 defines second axis 164. Pivotal link 152 renders second leg 150 rotatable about second axis 164. The offset between axes 162 and 164 accommodates vehicles having upper rear edge 36 that is horizontally offset to the vehicle's vertical rear edges 32 and 34. FIG. 3, for example, shows vehicle 12 with an offset distance 168 between upper rear edge 36 and edges 32 and 34.

FIG. 14 illustrates an example weather barrier method 170 involving the use of weather barrier apparatus 10. In this example, block 172 in FIG. 14 and arrow 174 in FIG. 3 illustrate vehicle 12 moving toward doorway 20. Block 176 illustrates rearward facing edge 28 engaging first seal segment 26a and second seal segment 26b of side edge seal 26. Block 178 and FIGS. 2 and 11 illustrate creating or causing a first line of contact 180 between first seal segment 26a and rearward facing edge 28 of vehicle 12. Block 182 and FIGS. 2 and 11 illustrate creating or forming a second line of contact 184 between second seal segment 26b and rearward facing edge 28 of vehicle 12, where second line of contact 184 is substantially collinear with first line of contact 180. Block 186 and FIG. 2 in comparison to FIG. 1 illustrate second seal segment 26b moving relative to first seal segment 26a in a direction substantially parallel to first line of contact 180 and second line of contact 182. Block 188 illustrates first seal segment 26a engaging first rear edge 32 of vehicle 12, and block 190 illustrates second seal segment 26b engaging first rear edge 32 of vehicle 12.

FIG. 15 illustrates another example weather barrier method 192 involving the use of weather barrier apparatus 10. In this example, block 194 and arrow 174 of FIG. 3 illustrate vehicle 12 moving toward doorway 20 such that rearward facing edge 28 faces and approaches wall 18 and/or doorway 20. Block 196 and FIG. 11 illustrate rearward facing edge 28 of vehicle 12 engaging a rear edge seal 198 (e.g., seal 78 and/or 126) of weather barrier apparatus 10. Block 200, FIG. 13 in comparison to FIG. 12, and arrows 202, 204 and 206 illustrate while backing vehicle 12 toward a doorway 20, vehicle 12 shifting weather barrier apparatus 10. Block 208, arrow 210 of FIG. 13, and FIG. 13 in comparison to FIG. 12 illustrate in reaction to vehicle 12 shifting weather barrier apparatus 10, upper seal member 24 and/or side seal member 26 increasing in length. Arrow 210 of FIG. 13 illustrates upper side seal segment 26b sliding along lower side seal segment 26a.

FIG. 16 illustrates another example weather barrier method 212 involving the use of weather barrier apparatus 10. In this example, block 214 in FIG. 16 and arrow 174 of FIG. 3 illustrate backing vehicle 12 toward doorway 20. Block 216, FIG. 5 and FIG. 10 illustrate, as a result of backing vehicle 12 toward doorway 20, rearward facing edge 28 engaging rear edge seal 198 (e.g., seal 78 and/or 126) while a surface seal 218 (e.g., seal 80 and/or 128) is spaced apart from vehicle 12. Block 220 and arrow 222 of FIG. 10 illustrates after rearward facing edge 28 effectively engages rear edge seal 198 (e.g., seal 78 and/or 126) while a surface seal 224 (e.g., seal 80 and/or 128) is spaced apart from vehicle 12, backing vehicle 12 closer to doorway 20. Block 226, comparing FIGS. 10 and 11, and comparing FIGS. 5 and 6 illustrate while backing vehicle 12 closer to doorway 20, pushing rear edge seal 198 closer to doorway 20. Block 228, FIGS. 6 and 11 illustrate in reaction to pushing rear edge seal 198 closer to doorway 20, forcing or causing surface seal 224 into effective engagement with vehicle panel 82 or 130 at a point spaced apart from rear edge seal 198. Block 230 and arrow 232 of FIG. 10 illustrate while backing vehicle 12 closer to doorway 20, rotating rear edge seal 198 and surface seal 224 about substantially vertical axis 134. Block 234 and arrow 236 of FIG. 10 illustrate while backing vehicle 12 closer to doorway 20, bending side support member 112 toward vehicle 12. Block 238 and arrow 238 of FIG. 10 illustrate while backing vehicle 12 closer to doorway 20, moving the substantially vertical axis 122 closer to vehicle panel 130. Block 240, a force arrow 242 of FIG. 6 and a force arrow 244 of FIG. 11 illustrate rear edge seal 198 exerting a first force (force 242 or force 244) against rearward facing edge 28. Block 246, a force arrow 248 of FIG. 6 and a force arrow 250 of FIG. 11 illustrate surface seal 224 exerting a second force (force 248 or 250) against vehicle panel 82 or 130, where first force 242 is greater than second force 248, or first force 244 is greater than second force 250. Block 252 illustrates increasing the first force (force 242 or 244). Block 254 illustrates increasing the second force (e.g., force 250) in reaction to increasing the first force (e.g., force 244).

Figure 17:
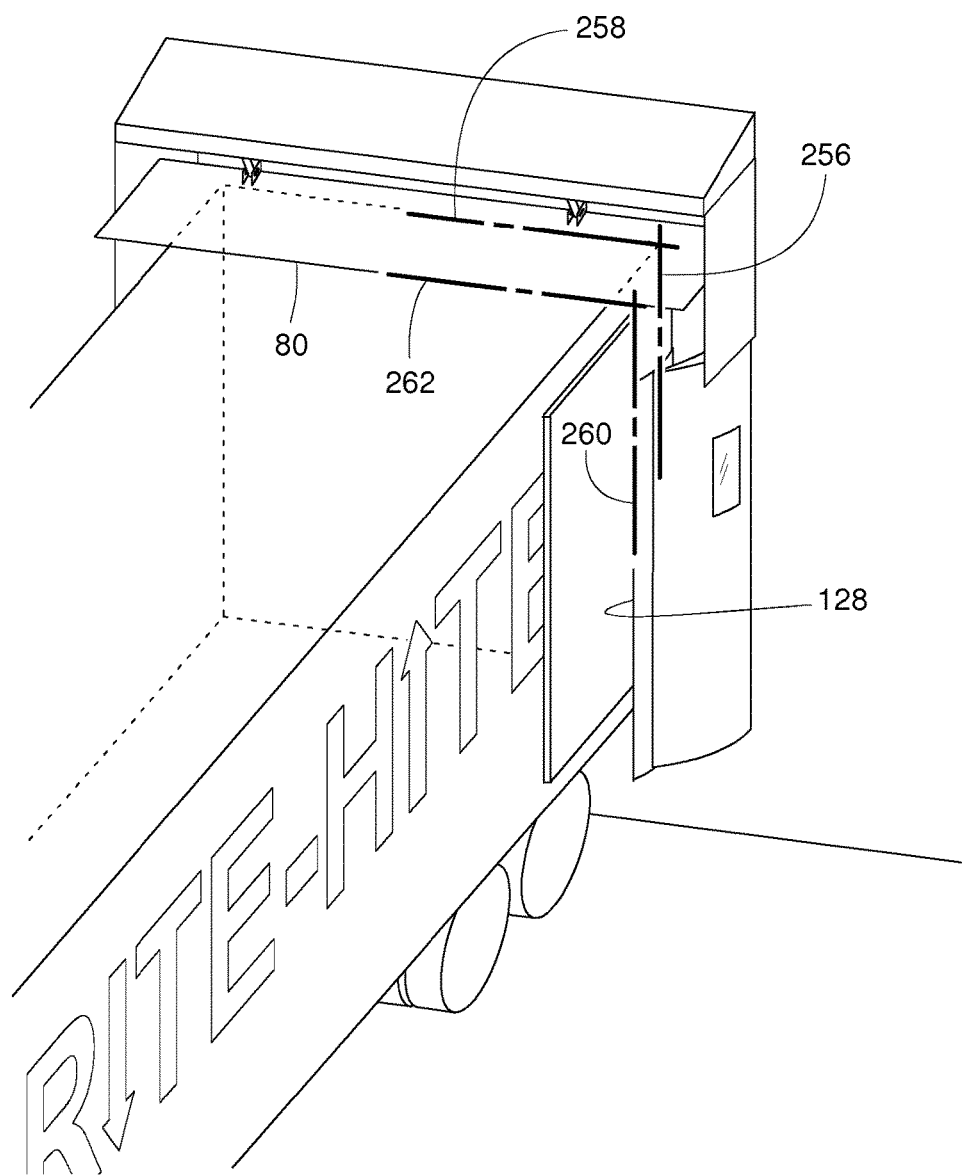
FIG. 17 is a perspective view showing example contact lines of an example weather barrier apparatus constructed in accordance with teachings disclosed herein.

FIG. 17, with further reference to FIGS. 1, 2, 6 and 11, shows various lines of contact between vehicle 12 and some examples of weather barrier apparatus 10. In the illustrated example of FIG. 17, side edge seal 126 engages vehicle 12 along a first line or area of contact 256, upper edge seal 78 engages vehicle 12 along a second line or area of contact 258, side surface seal 128 engages vehicle 12 along a third line or area of contact 260, and upper surface seal 80 engages vehicle 12 along a fourth line or area of contact 262. In this example, first contact line 256 and third contact line 260 are spaced apart and substantially parallel to each other, second contact line 258 and fourth contact line 262 are spaced apart and substantially parallel to each other, first contact line 256 and second contact line 258 are substantially coplanar, and third contact line 260 and fourth contact line 262 are substantially coplanar. The coplanar relationship of lines 256 and 258 helps prevent leakage through the seals where lines 256 and 258 intersect. The same is true for lines 260 and 262.

In the example illustrated in FIGS. 18, 19 and 20 a weather barrier apparatus 264 includes an example header structure 266 that provides a rear edge seal 268 and an upper surface seal 270. Some examples of header structure 266 also include a front curtain 272 to further shelter the upper rear portion of vehicle 12. In reaction to vehicle 12 backing into weather barrier apparatus 264 from the position shown in FIG. 18 to the position shown in FIG. 19, rear edge seal 268 engages the vehicle's upper rear edge 36, and surface seal 270 engages the vehicle's upper panel 82.

In some examples, header structure 266 comprises two extendible swing arms 64 each with its upper end 66 pivotally attached to upper support member 62. Spring 104 (e.g., extension spring, elastic band, etc.) urges swing arm 64 to a retracted position shown in FIG. 18. A lower end 274 of swing arm 64 connects to a pivot point 276 on an arm 278 shaped generally as shown in FIGS. 18-20. In this example, a rear curtain 280, which provides the sealing surfaces of upper surface seal 270 and rear edge seal 268, is attached to the upper ends of arms 278. In some examples, a lower end 282 of each arm 278 extends through a notch 284 at the lower edge of rear curtain 280.

When vehicle 12 backs into weather barrier apparatus 264, as indicated by arrow 284 of FIG. 18, the arm's lower end 282 catches the vehicle's upper rear edge 36. As vehicle 12 continues traveling back toward doorway 20, upper rear edge 36 engaging the arm's lower end 282 extends swing arm 64 and forces or causes arms 64 and rear curtain 280 to pivot down against the vehicle's upper panel 82, as shown in FIG. 19. In this position, rear edge seal 268 seals against the vehicle's upper rear edge 36 and surface seal 270 and front curtain 280 seal against the vehicle's upper panel 82.

Figure 21:
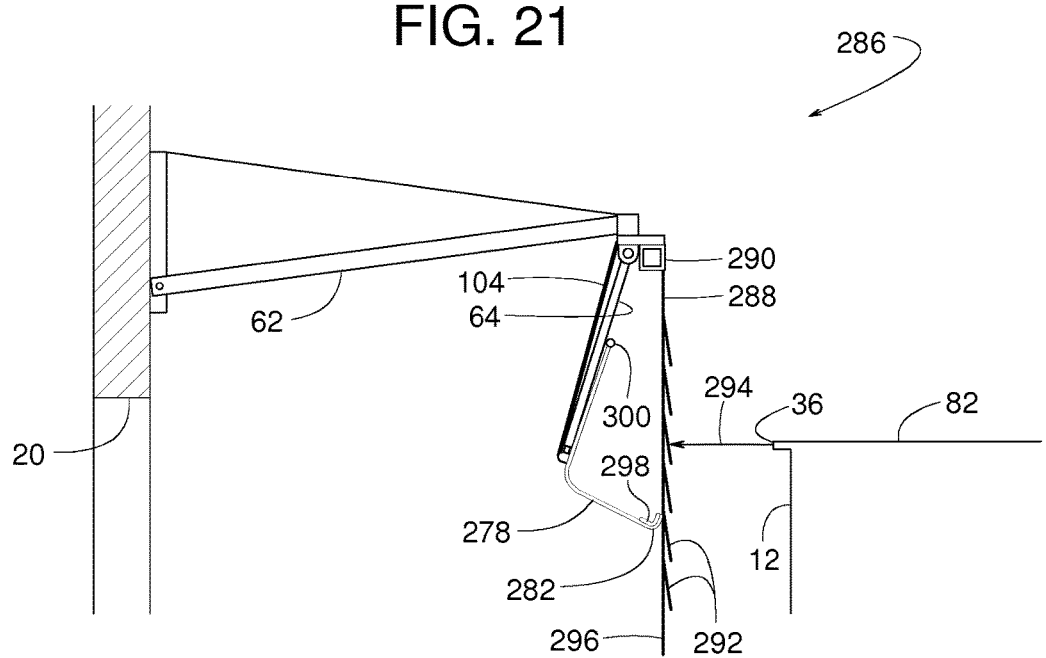
FIG. 21 is a side view of an example weather barrier apparatus constructed in accordance with teachings disclosed herein.
Figure 22:
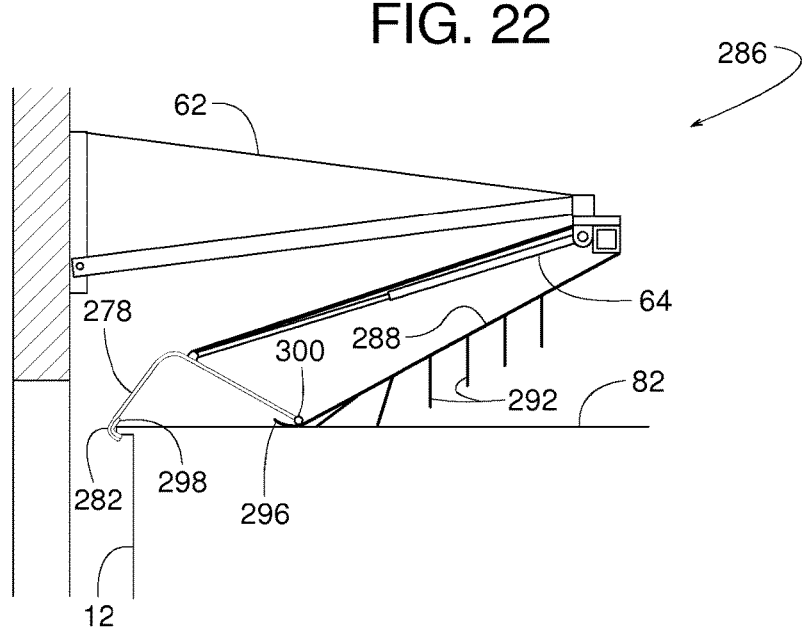
FIG. 22 is a side view similar to FIG. 21 but showing a vehicle engaging the example weather barrier apparatus of FIGS. 18-21.

FIGS. 21 and 22 show an example header structure 286 similar to header structure 266 of FIGS. 18-20. With header structure 286, however, a main curtain 288 replaces front curtain 272, and rear curtain 280 is omitted. Main curtain 288, in some examples, hangs from a forward point 290 on upper support member 62 and lies in front of arm 64. In the illustrated example, main curtain 288 has a series of overlapping panels 292, at least some of which press down and seal against the vehicle's upper panel 82, as shown in FIG. 22.

When vehicle 12 backs into the weather barrier apparatus 286, as indicated by arrow 294 of FIG. 21, the arm's lower end 282 catches the vehicle's upper rear edge 36. As vehicle 12 continues traveling back toward doorway 20, upper rear edge 36 engaging the arm's lower end 282 extends swing arm 64 and forces or causes arms 64 to pivot down against the vehicle's upper panel 82, whereby a lower end 296 of main curtain 288 becomes pinched or captured between an upper end 300 of arm 278 and the vehicle's upper panel 82. With the curtain's lower end 296 pinched between the arm's upper end 300 and the vehicle's upper panel 82, further movement of vehicle 12 toward doorway 20 pulls main curtain 288 taut, as shown in FIG. 22. In this position, a rear edge seal 298 seals against the vehicle's upper rear edge 36 while upper end 300 and at least some of the overlapping panels 292 seal against the vehicle's upper panel 82.

Figure 23:
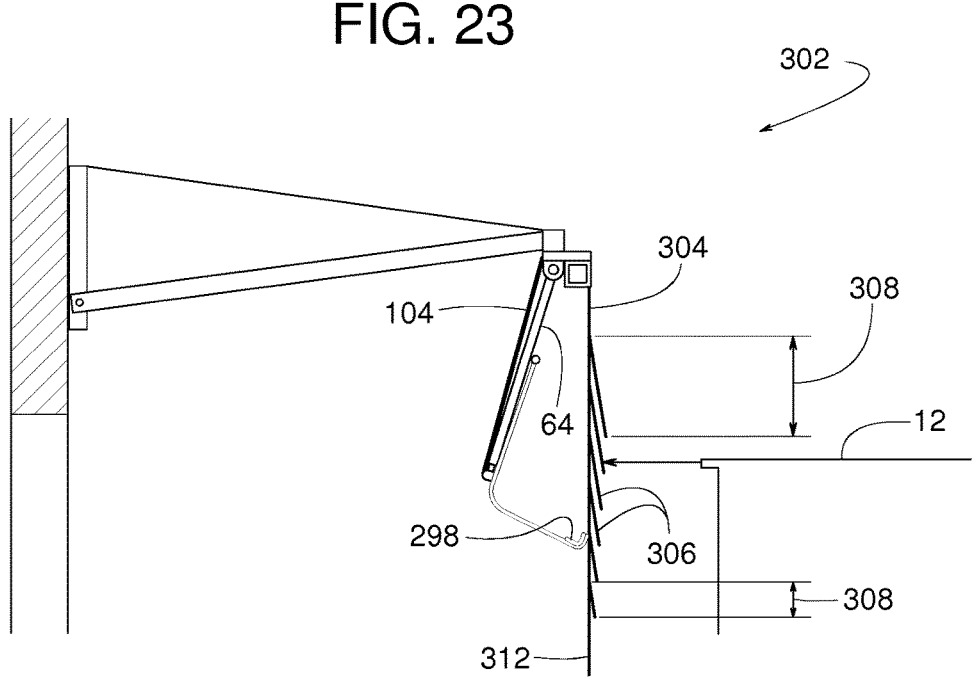
FIG. 23 is a side view of an example weather barrier apparatus constructed in accordance with teachings disclosed herein.
Figure 24:
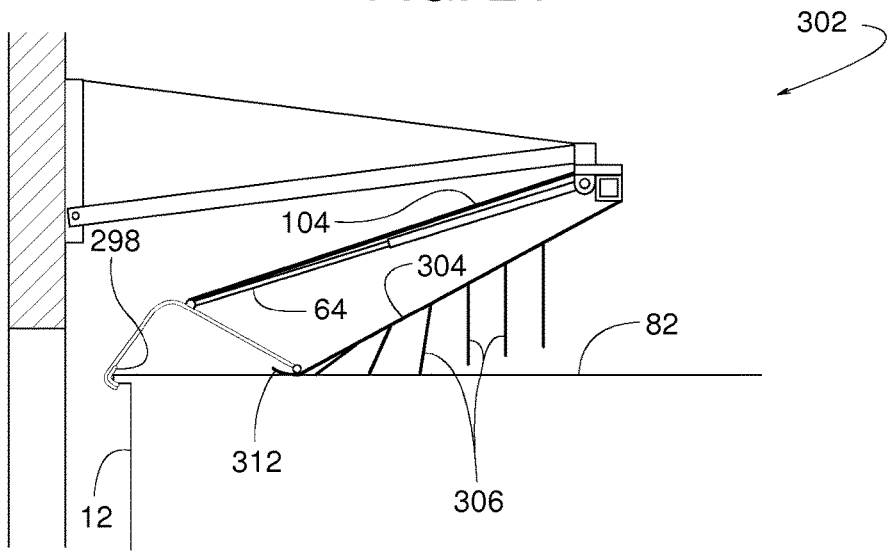
FIG. 24 is a side view similar to FIG. 23 but showing a vehicle engaging the example weather barrier apparatus of FIG. 23.

FIGS. 23 and 24 show an example header structure 302 similar to header structure 286 of FIGS. 21-22. However, header structure 302 has a main curtain 304 with a series of overlapping panels 306 of varying length (e.g., lengths 308 and 310). The vertical length of each panel 306 is greater with its distance from the main curtain's lower end 312. This increases the number of panels 306 that can effectively reach and, thus, seal against the vehicle's upper panel 82, as shown in FIG. 24.

Figure 25:
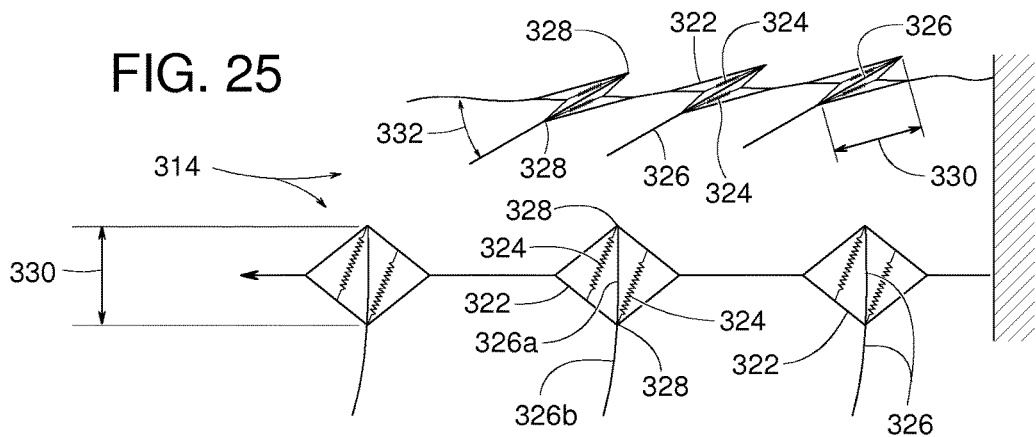
FIG. 25 is a schematic view illustrating an example operation of an example curtain constructed in accordance with teachings disclosed herein.
Figure 26:
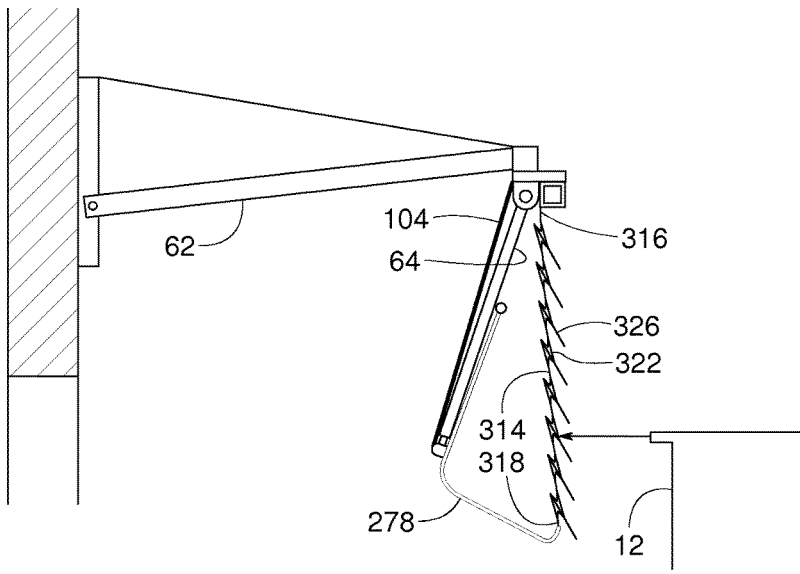
FIG. 26 is a side view of an example weather barrier apparatus constructed in accordance with teachings disclosed herein.
Figure 27:
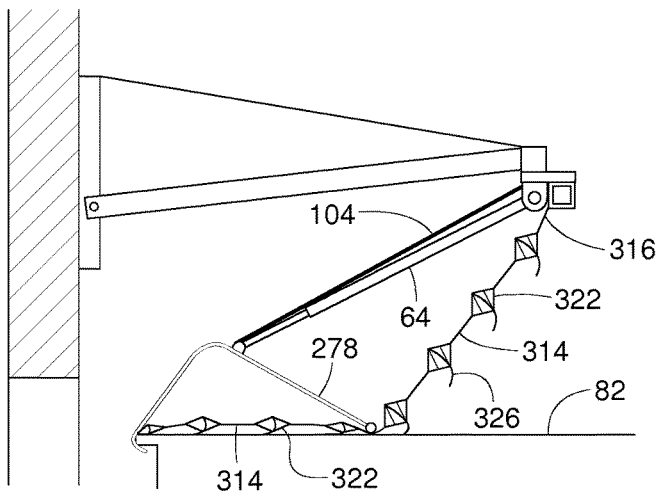
FIG. 27 is a side view similar to FIG. 26 but showing a vehicle engaging the example weather barrier apparatus of FIG. 26.
Figure 28:
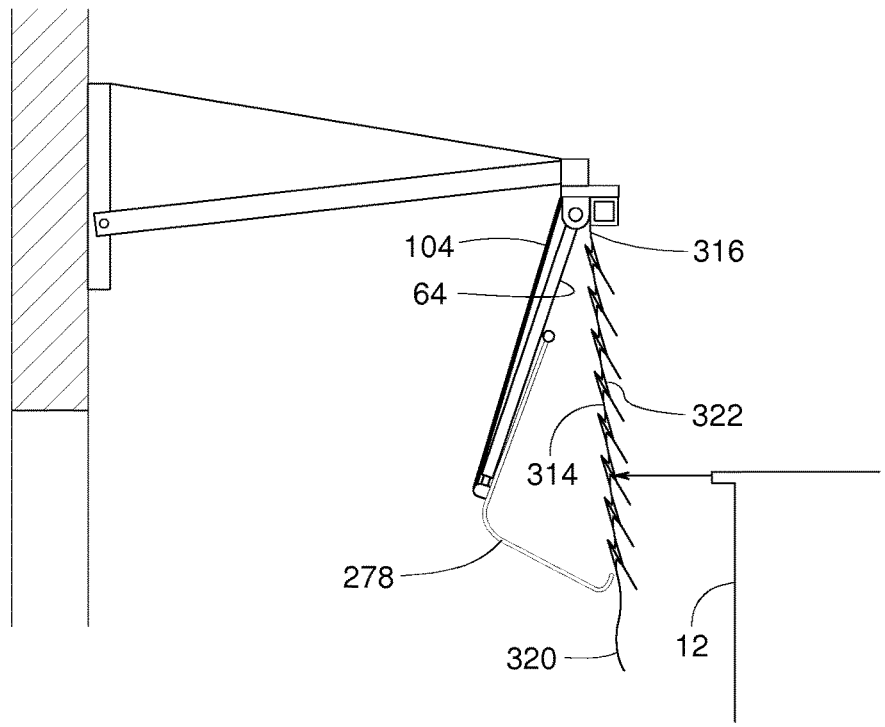
FIG. 28 is a side view of an example weather barrier apparatus constructed in accordance with teachings disclosed herein.
Figure 29:
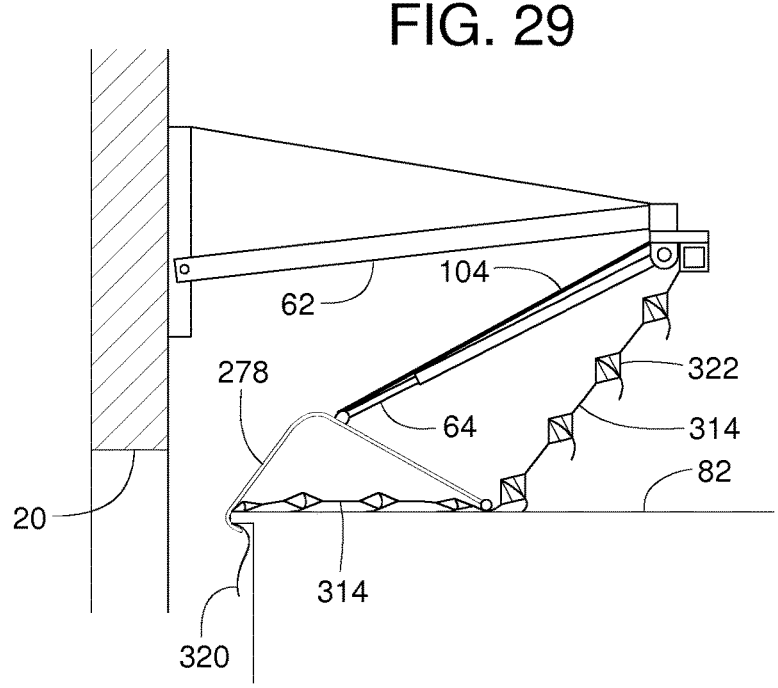
FIG. 29 is a side view similar to FIG. 28 but showing a vehicle engaging the example weather barrier apparatus of FIG. 28.

FIGS. 25-29 illustrate an example curtain 314 that expands to provide greater sealing pressure against the vehicle's upper panel 82. FIGS. 26 and 27 show an upper end 316 of curtain 314 attached to upper support member 62 and a lower end 318 attached to the lower end of arm 278. In the example of FIGS. 28 and 29, however, the curtain's lower end 320 overhangs but does not necessarily connect to the lower end of arm 278. Nonetheless, in either example, as vehicle 12 backs toward doorway 20 and thus forces arm 64 to extend, curtain 314 is pulled taut due to the curtain's lower end 318 and 320 being either attached to or pinched against the lower end of arm 278.

The upper section of FIG. 25 shows curtain 314 relaxed (as would be the case in FIGS. 26 and 28), and the lower section of FIG. 25 shows curtain 314 pulled in tension (as would be the case in FIGS. 27 and 29). In the illustrated examples, curtain 314 includes a series of flexible rectangular tubes 322 that are collapsible. Tubes 322 are horizontally elongate and are interconnected generally parallel to each other. Each tube 322 has internal elastic biasing elements or ties 324 that tend to pull their respective tube 322 to a collapsed state, as shown in the upper section of FIG. 25. Each tube 322 also has a semi-rigid panel 326 having an internal portion 326a inside tube 322 and a protruding portion 326b extending beyond tube 322. Internal portion 326a holds opposite corners 328 of tube 322 at a generally fixed separation distance 330, regardless of whether curtain 314 is relaxed or taut. When curtain 314 is relaxed (FIG. 26, FIG. 28 and the upper section of FIG. 25), elastic ties 324 collapse tube 322 so that the semi-rigid panel 326 lies at an acute angle 332 to curtain 314 itself. When curtain 314 is pulled taut (FIG. 27, FIG. 29 and the lower section of FIG. 25), the curtain's overall tension overcomes the tension in elastic ties 324, which causes tube 322 to expand to a rectangular shaped profile so that the semi-rigid panel 326 extends generally perpendicular to curtain 314.

In the examples illustrated in FIGS. 25-29, the curtain's ability to extend accommodates the extension of swing arm 64 and the pivotal motion of arm 278. Also, as curtain 314 extends, the overall tension in curtain 314 transfers to the series of semi-rigid panels 326 in the form of sealing pressure against the vehicle's upper panel 82.

Figure 30:
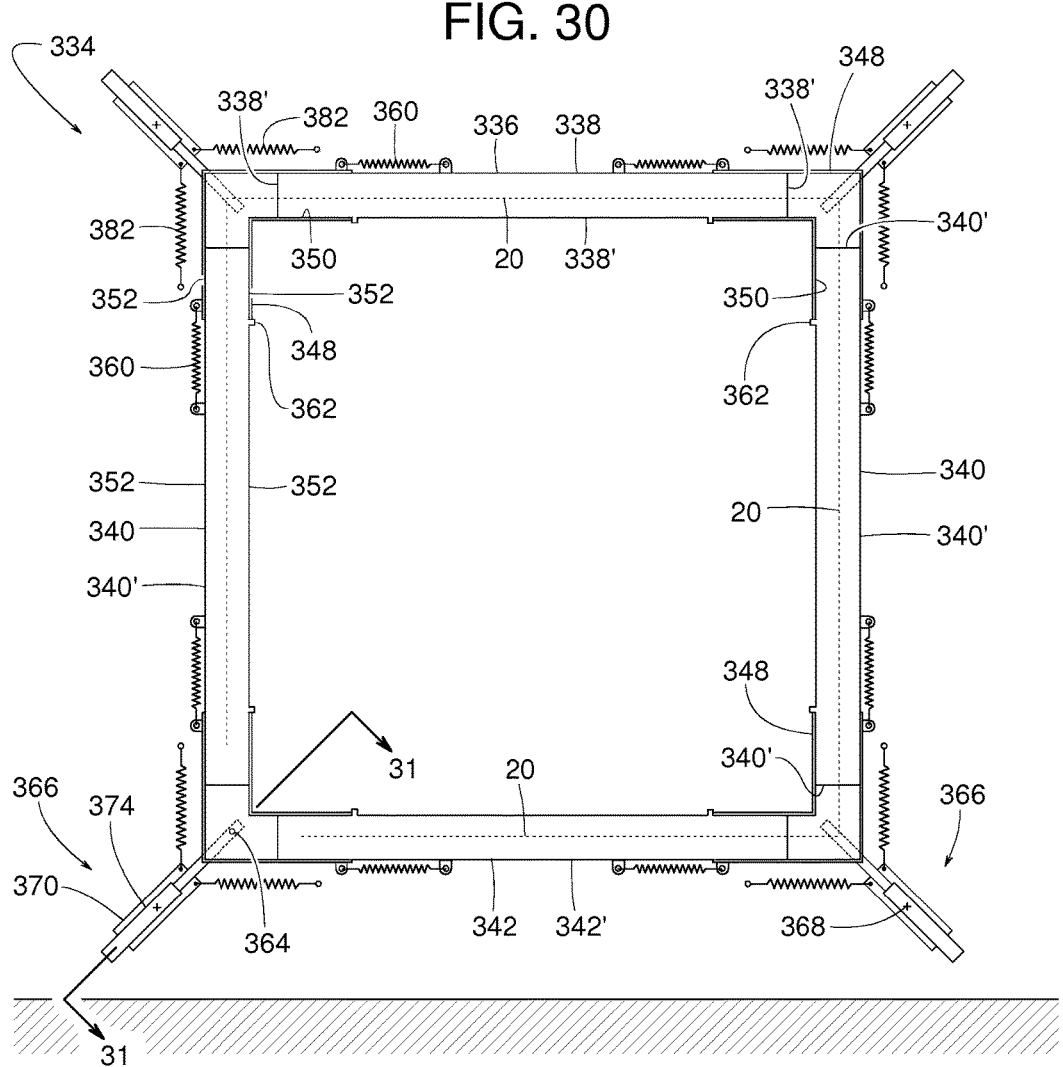
FIG. 30 is a front view of an example weather barrier apparatus constructed in accordance with teachings disclosed herein.
Figure 31:
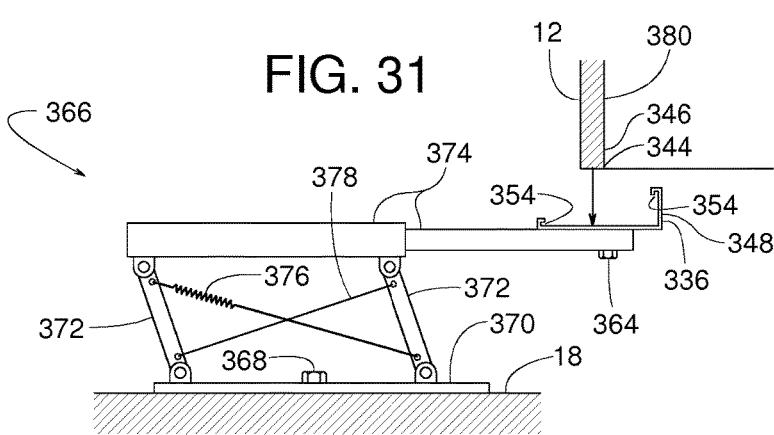
FIG. 31 is a cross-sectional view taken generally along line 31-31 of FIG. 30.
Figure 32:
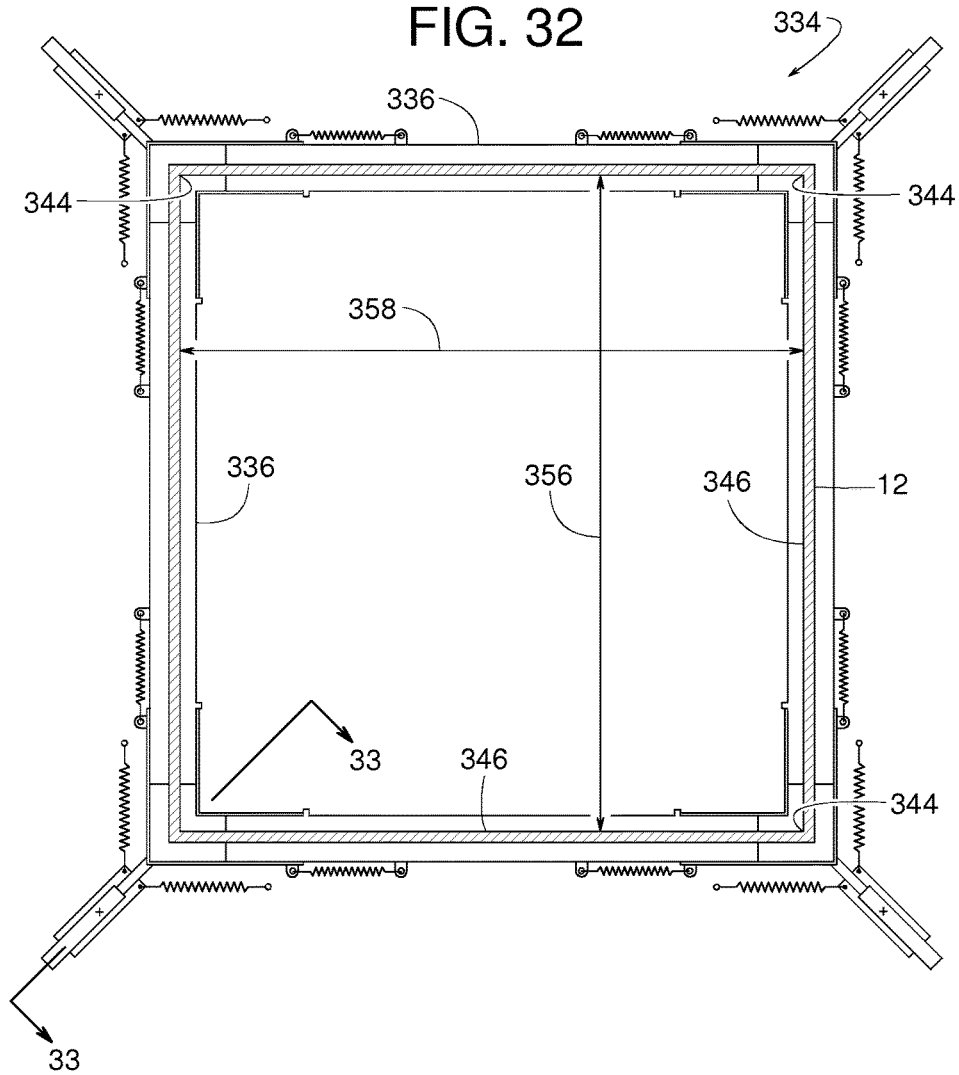
FIG. 32 is a front view similar to FIG. 30 but showing a vehicle's initial contact with the example weather barrier apparatus of FIGS. 30 and 31.
Figure 33:
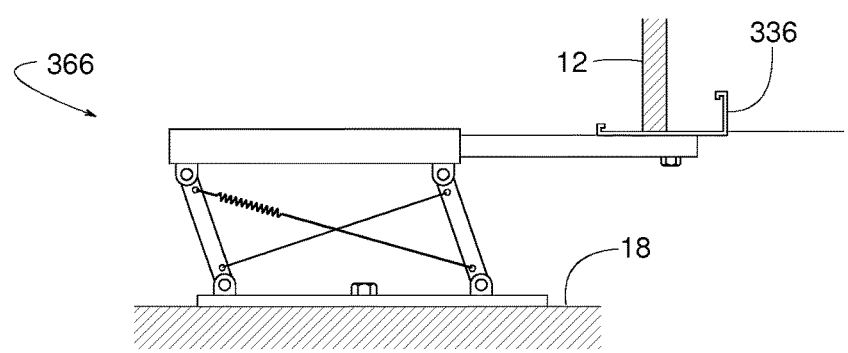
FIG. 33 is a cross-sectional view taken generally along line 33-33 of FIG. 32.
Figure 34:
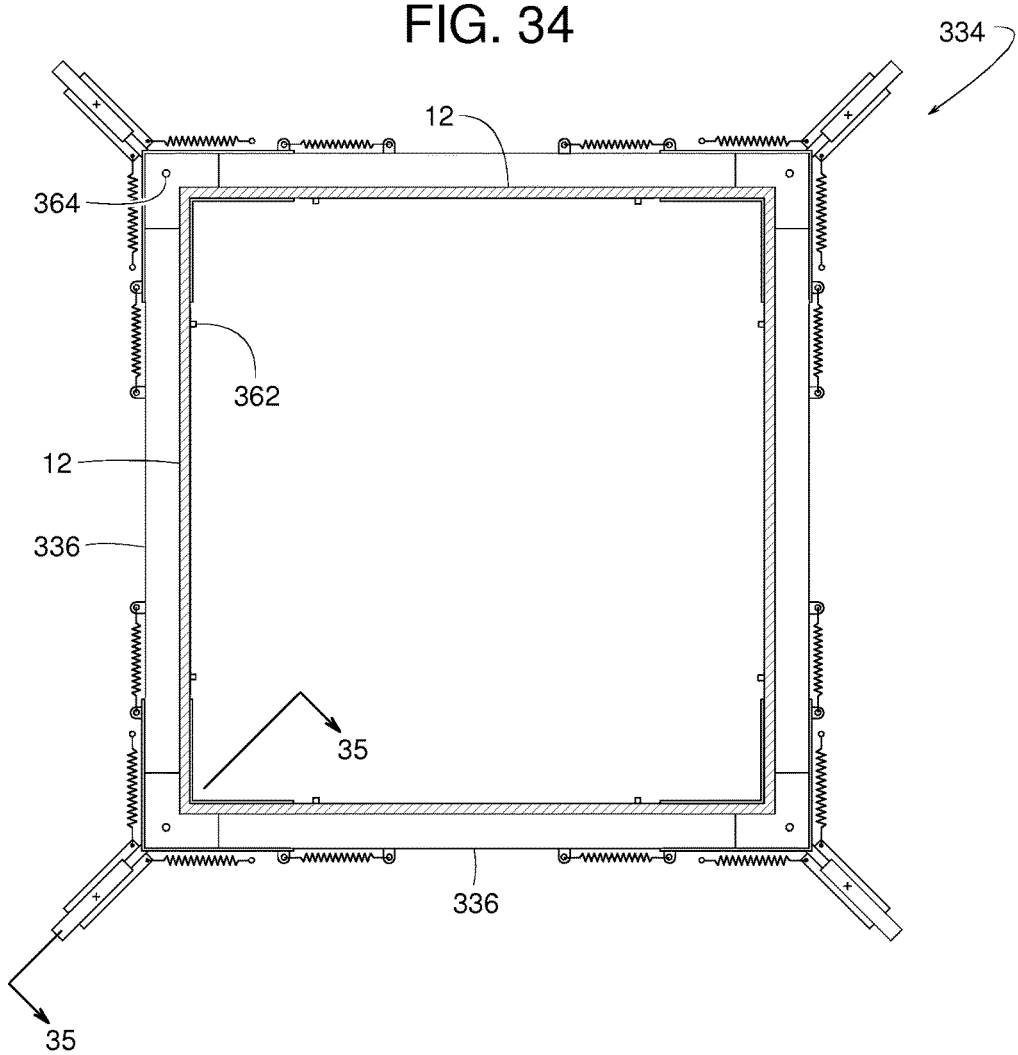
FIG. 34 is a front view similar to FIG. 32 but showing the vehicle having moved closer toward the wall and the example weather barrier apparatus reacting accordingly.
Figure 35:
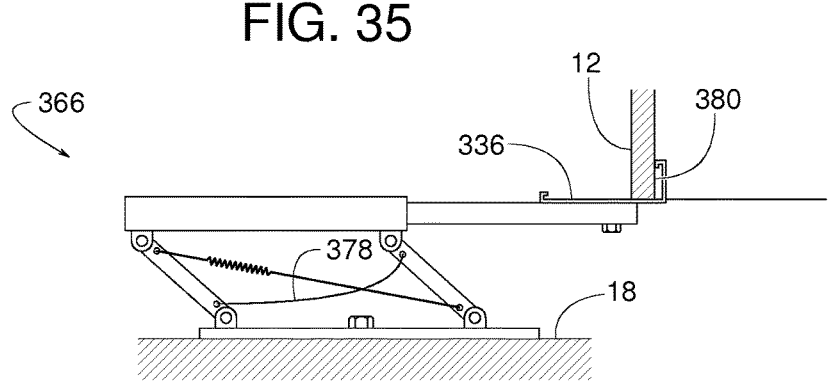
FIG. 35 is a cross-sectional view taken generally along line 35-35 of FIG. 34.
Figure 36:
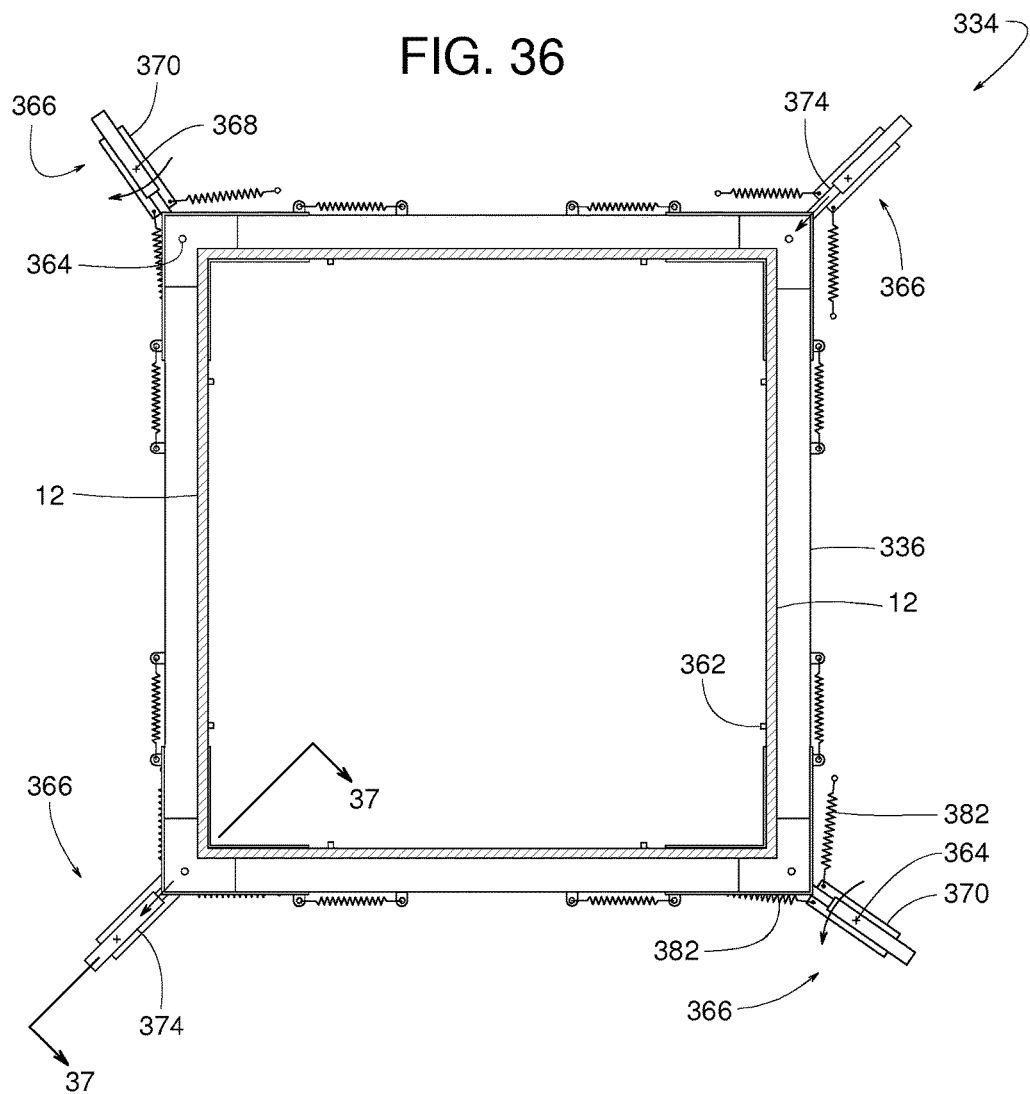
FIG. 36 is a front view similar to FIG. 34 but showing the vehicle having shifted downward and leftward with the example weather barrier apparatus reacting accordingly.
Figure 37:
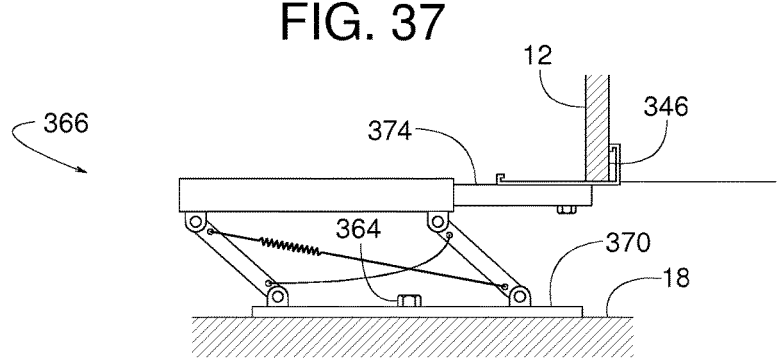
FIG. 37 is a cross-sectional view taken generally along line 37-37 of FIG. 36.

FIGS. 30-37 illustrate an example weather barrier apparatus 334 that includes a rectangular seal assembly 336 having an upper seal member 338, two side seal members 340, and a lower seal member 342 that generally encircle doorway 20. Seal members 338, 340 and 342 seek and seal against inner corners 344 of a vehicle's rear cargo opening 346 (e.g., all four corners of a rectangular shaped rear cargo opening) in reaction to vehicle 12 backing into weather barrier apparatus 334. FIGS. 30 and 31 show vehicle 12 approaching weather barrier apparatus 344. FIGS. 32 and 33 show initial contact between vehicle 12 and weather barrier apparatus 344 as vehicle 12 moves toward doorway 20. FIGS. 34 and 35 show vehicle 12 forcing seal members 338, 340 and 342 closer to wall 18, and FIGS. 36 and 37 show weather barrier apparatus 334 having shifted in reaction to vehicle 12 moving down and to the left (as viewed in FIG. 36).

Seal members 338, 340 and 342 of the illustrated example include four corner seal segments 348 that telescopically interconnect an upper seal segment 338', two side seal segments 340', and a lower seal segment 342'. In some examples, a telescopic connection 350 comprises edges 352 of seal segments 338', 340' and 342' sliding lengthwise within slots 354 of corner segment 348. In reaction to vehicle 12 backing into weather barrier apparatus 334, telescopic connections 350 allow seal members 338, 340 and 342 to shift in a direction (e.g., a vertical and/or horizontal direction) parallel to wall 18 so that weather barrier apparatus 334 can expand to accommodate (e.g., fit the inside) height 356 and width 358 of the vehicle's rear cargo opening 346. In some examples, when no vehicle is present, springs 360 (e.g., extension spring, elastic cord, etc.) draw or position seal segments 338', 340' and 342' into corner segments 348 to reduce or minimize the height and width of the rectangular seal assembly 336. Stops 362 on seal segments 338', 340' and 342' engage corner segments 348 to limit the dimensions of seal assembly 336.

To support seal assembly 336 in a way that allows it to expand and seal against the vehicle's inner corners 344, a rotatable fastener 364 connects each corner segment 348 to a movable support mechanism 366, and another rotatable fastener 368 connects a base plate 370 of support mechanism 366 to wall 18. In some examples, support mechanism 366 is a four-bar linkage having two pivotal links 372 connecting a telescopic bar 374 to base plate 370. In addition or as an alternative to springs 360, an extension spring 376 urges support mechanism 366 toward the center of doorway 20. In some examples, a cable 378 limits or restricts how far support mechanism 366 can lean forward or extend toward the center of doorway 20.

An example sequence of operation can follow the progression of FIGS. 30, 32, 34 and 36 (and their corresponding FIGS. 31, 33, 35 and 37, respectively). In FIGS. 30 and 31, vehicle 12 is spaced apart from weather barrier apparatus 334, rectangular seal assembly 336 is at an initial position having an initial or minimum size, and support member 366 is leaning forward.

FIGS. 32 and 34 show initial contact between a rear edge of vehicle 12 and the front face of seal assembly 336. At this point, seal assembly 336 has not yet expanded to meet the inner dimensions of the vehicle's rear cargo opening 346.

As vehicle 12 continues moving back toward wall 18, from the position shown in FIG. 33 to that of FIG. 35, the pressure of vehicle 12 against the face of seal assembly 336 forces or causes support mechanism 366 to lean or move back in a direction away from the center of doorway 20. This action urges seal assembly 336 to expand against inner surfaces 380 of the rear cargo or trailer of vehicle 12, as shown in FIGS. 34 and 35.

Referring to FIGS. 36 and 37, if cargo opening 346 is not perfectly centered with doorway 20 or if vehicle 12 moves laterally and/or vertically, support mechanisms 366 shift to accommodate such offsets or movements. FIGS. 36 and 37 show vehicle 12 shifted lower and to the left of center of doorway 20. To compensate, telescopic bar 374 of the upper-right support mechanism 366 extends (upper-right being with reference to FIG. 36), telescopic bar 374 of the lower-left support mechanism 366 retracts, base plate 370 of the lower-right support mechanism 366 rotates counterclockwise about fastener 364, and base plate 370 of the upper-left support mechanism 366 rotates clockwise about fastener 364. Slight extension of the upper-left and lower-right telescopic bars 374 might occur as well.

In addition or as an alternative to springs 360 and 376, some examples of weather barrier apparatus 334 include springs 382 that urge each base plate 370 to a predetermined rotational neutral position. In addition or alternatively, in some examples, support mechanism 366 includes a spring that biases telescopic bar 374 to a predetermined extended or retracted position. In some examples, support mechanism 366 does not include a spring that biases telescopic bar 374 to a predetermined position.

FIGS. 38-43 show an example support member 384 that can be used as either an upper support member of a header structure (e.g., a header structure 386 of FIGS. 38 and 39, or a header structure 388 of FIG. 40) or as a side support member of a side structure (e.g., a side structure 390 of FIGS. 41 and 42). In some examples, as shown in FIG. 43, support member 384 includes a flexible outer sheet 392 supported by a series of flexible rib panels 394 extending between two support bars 396. One or more flexible ties 398 connect rib panels 394 to outer sheet 392. In some examples, ties 398 have tensile strength but readily bend or buckle under compression. As an alternative to having the series of rib panels 394, some example support members have a single rib panel covering the full length of outer sheet 392.

Figure 38:
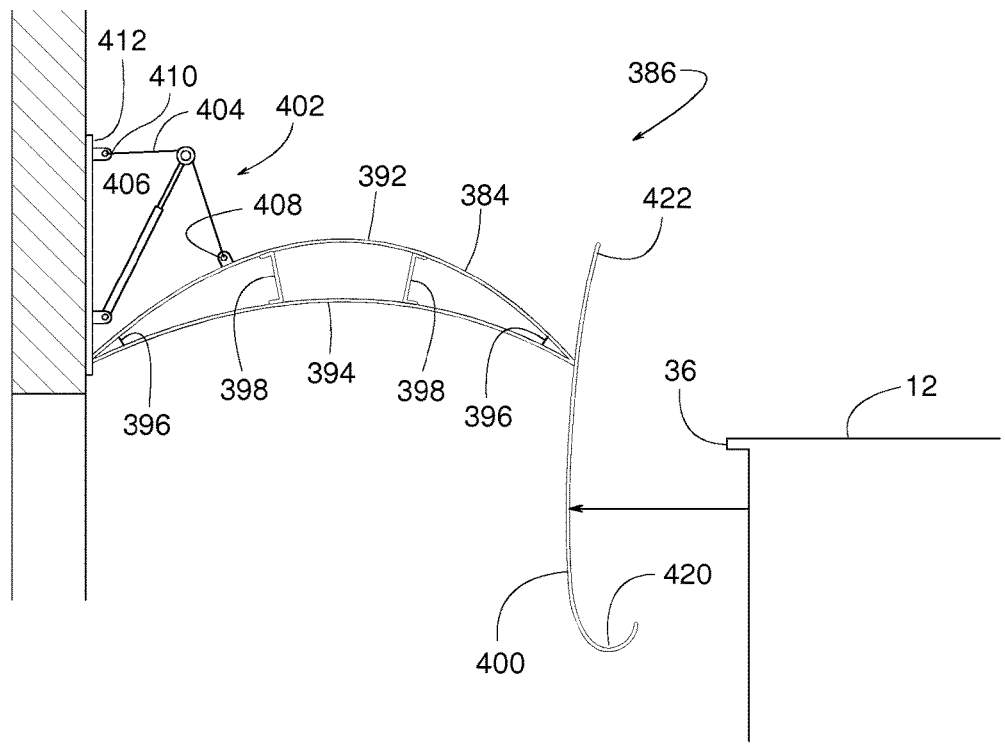
FIG. 38 is a side view of an example weather barrier apparatus constructed in accordance with teachings disclosed herein.
Figure 39:
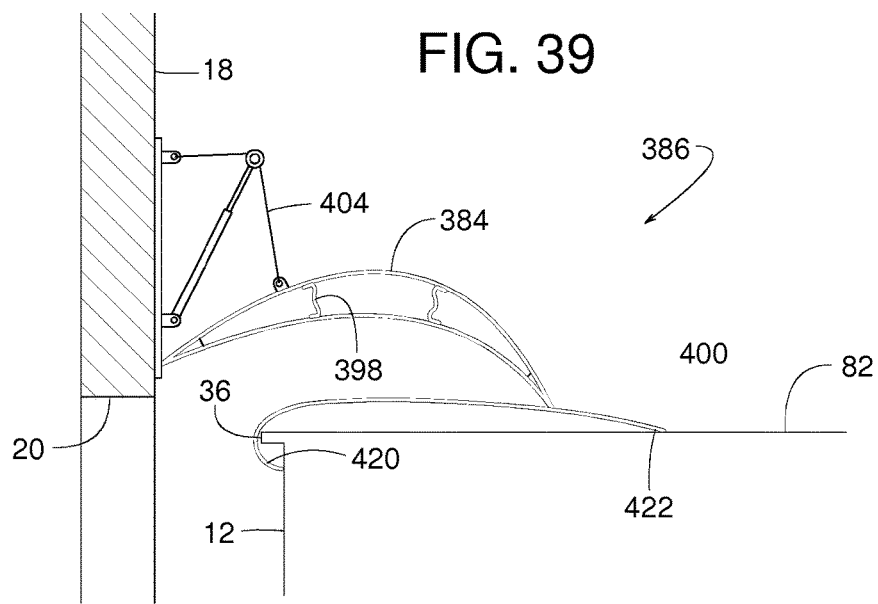
FIG. 39 is a side view similar to FIG. 38 but showing a vehicle engaging the example weather barrier apparatus of FIG. 38.
Figure 40:
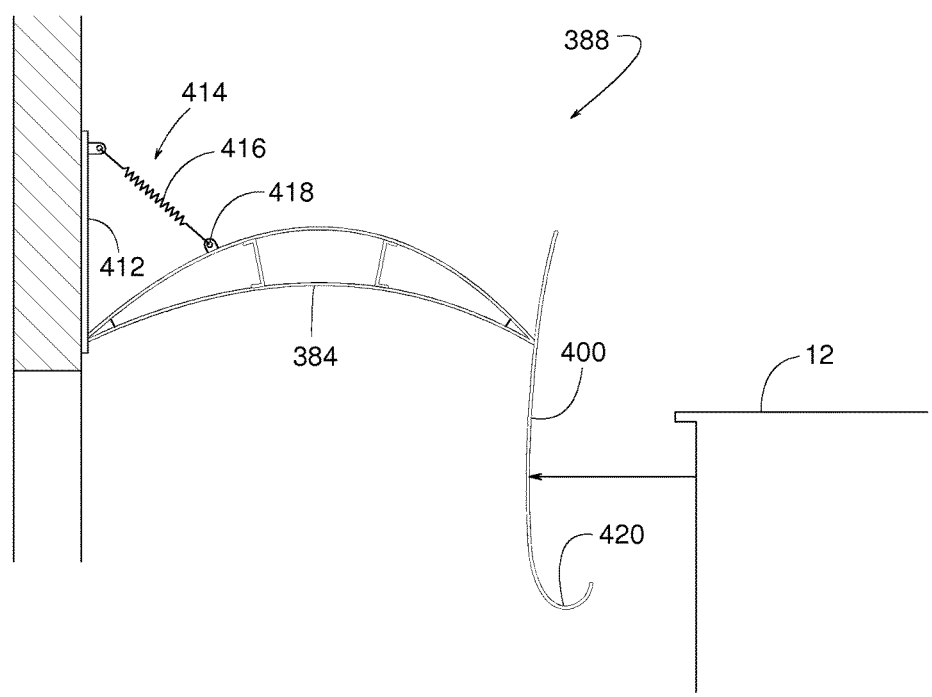
FIG. 40 is a top view of an example weather barrier apparatus constructed in accordance with teachings disclosed herein.
Figure 44:
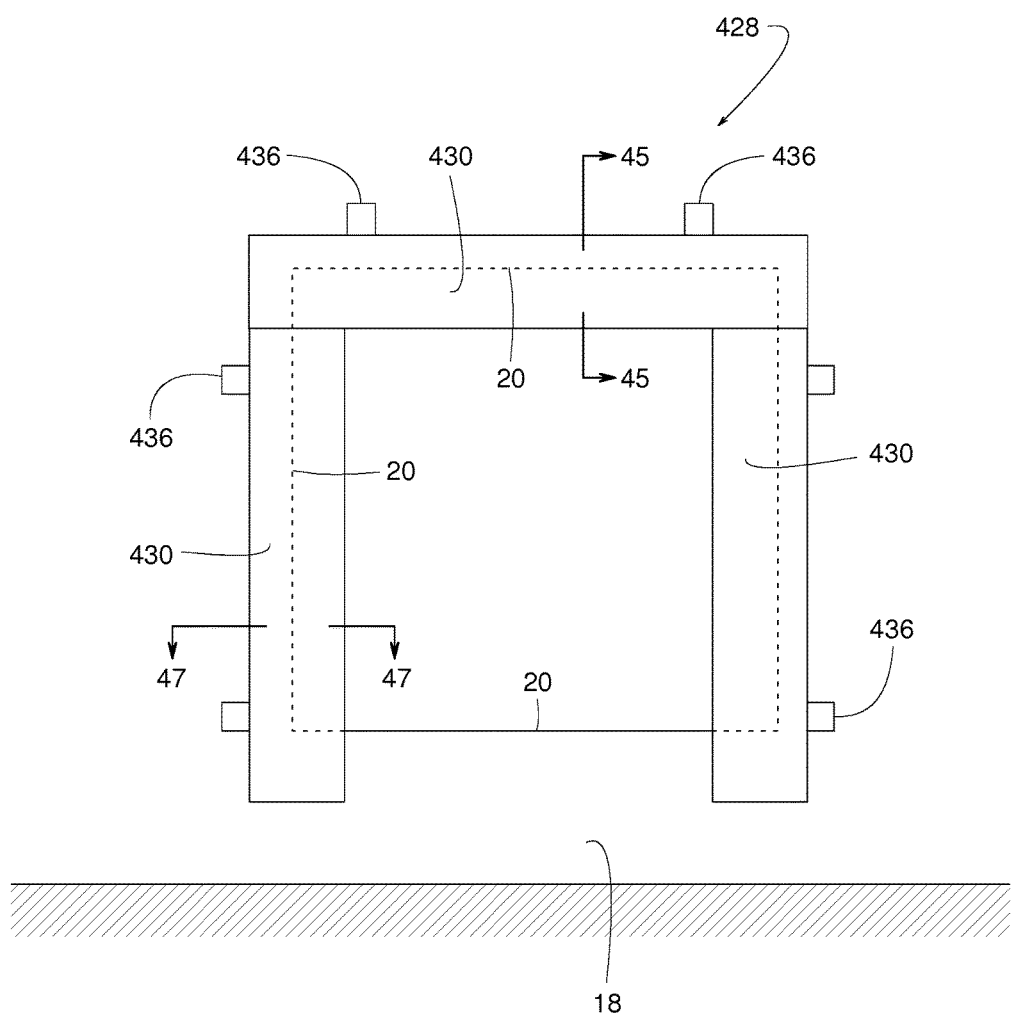
FIG. 44 is a front view of an example weather barrier apparatus constructed in accordance with teachings disclosed herein.

When used in header structure 386, as shown in FIGS. 38 and 39, an example upper seal member 400 is pivotally attached to support member 384, and a resilient suspension system 402 helps hold support member 384 generally horizontal. In some examples, resilient suspension system 402 comprises a cable 404 (or its equivalent such as a wire, chain, rope, strap, etc.) held in tension by a pneumatic compression spring 406 (or its equivalent). One end 408 of cable 404 connects to support member 384, and an opposite end 410 of cable 404 is anchored to a wall-mounting plate 412. In some examples, as shown in FIG. 40, a resilient suspension system 414 includes a spring 416 (e.g., extension spring, elastic cord, etc.) extending between wall-mounting plate 412 and a connection point 418 on support member 384.

As vehicle 12 backs into header structure 386 or 388, an upper edge seal 420 of upper seal member 400 engages the vehicle's upper rear edge 36, and an upper surface seal 432 of seal member 400 pivots downward against the vehicle's upper panel 82. The flexibility of support member 384 enables upper seal member 400 to move sealingly against vehicles (e.g., upper panels of vehicles) of various height and at various stopping distances or positions (e.g., horizontal distances) from wall 18.

When support member 384 is used in side structure 390, as shown in FIGS. 41 and 42, an example side seal member 400' (similar to upper seal member 400) is pivotally attached to support member 384. As vehicle 12 backs into side structure 390, a side edge seal 424 of side seal member 400' engages the vehicle's vertical rear edge 32, and a side surface seal 426 of seal member 400' pivots inward against the vehicle's side panel 130. The flexibility of support member 384 enables side seal member 400' to move sealingly against vehicles of various width and at various lateral positions relative to doorway 20.

FIGS. 44-48 show an example weather barrier apparatus 428 that includes a seal member 430 similar in construction to support member 384 of FIG. 43. In some examples, a flexible inner sheet 432 extends the full length of seal member 430. In some examples, a flexible outer sheet 434 extends the full length of seal member 430. In some examples, outer sheet 434 includes a plurality of vertically spaced-apart rib panels similar to rib panels 394 of FIG. 43. In some examples, ties 398 connect outer sheet 434 to inner sheet 432.

Figure 45:
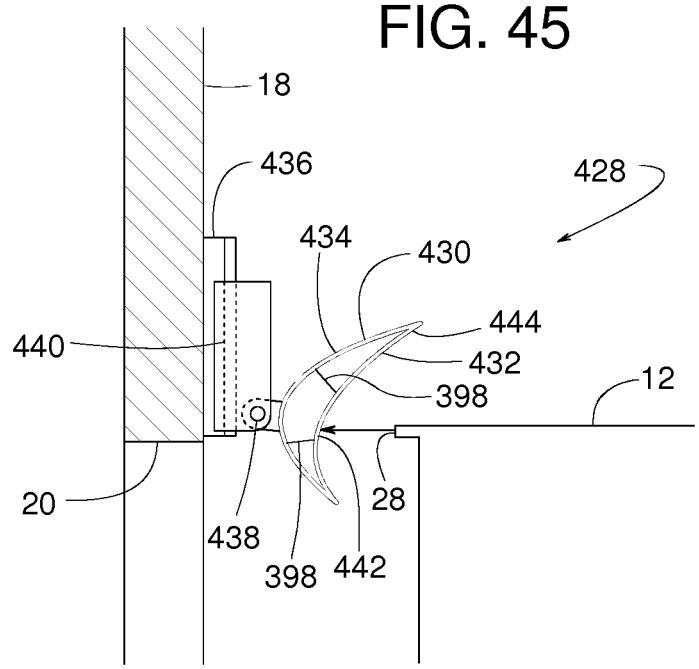
FIG. 45 is a cross-sectional view taken along line 45-45 of FIG. 44.
Figure 46:
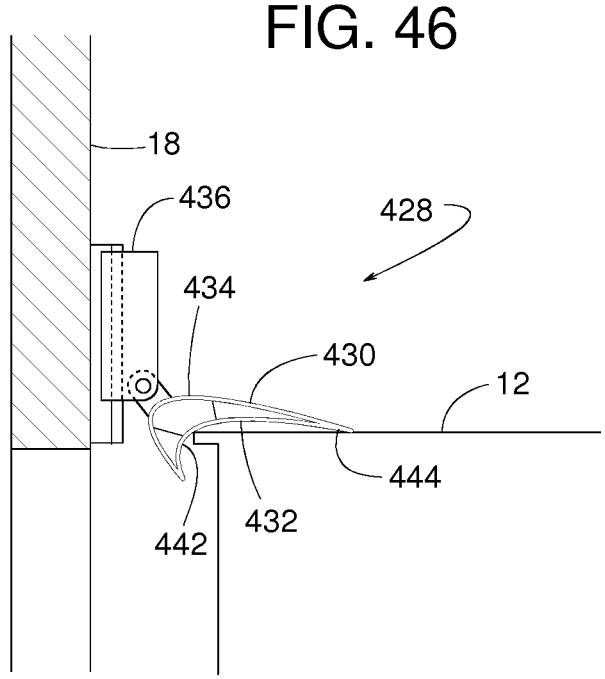
FIG. 46 is a cross-sectional view similar to FIG. 45 but showing a vehicle engaging the example weather barrier apparatus of FIGS. 44 and 45.
Figure 47:
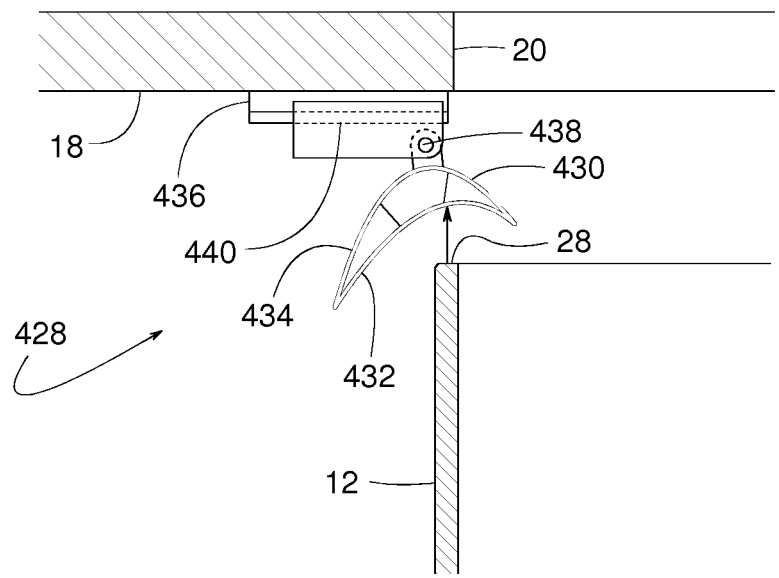
FIG. 47 is a cross-sectional view taken along line 47-47 of FIG. 44.
Figure 48:
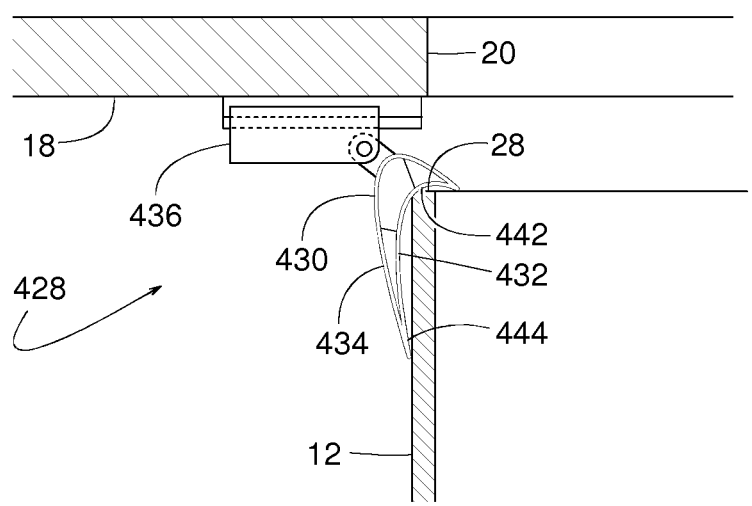
FIG. 48 is a cross-sectional view similar to FIG. 47 but showing a vehicle engaging the example weather barrier apparatus of FIGS. 44-47.

FIGS. 45 and 46 show seal member 430 configured as an upper seal member, and FIGS. 47 and 48 show seal member 430 configured as a side seal member. An example mounting device 436 connects seal member 430 to wall 18. In some examples, mounting device 436 includes a pivotal joint 438 and/or a translating joint 440 that allows seal member 430 to pivot and/or translate (e.g., laterally) relative to wall 18.

In reaction to vehicle 12 backing into weather barrier apparatus 428, the vehicle's rearward facing edge 28 displaces and compressively distorts (e.g., resiliently deforms) seal member 430 such that seal member 430 generally conforms to the shape of vehicle 12 in the area of rearward facing edge 28. In some examples, the seal member's rotation and/or translation enable an edge seal 442 and a surface seal 444 of seal member 430 to seal respectively against the vehicle's rearward facing edge 28 and a surface panel (e.g., upper panel 82 or side panel 130).

For further clarification, the vehicle's first and second rear edges 32 and 34 extending vertically means that edges 32 and 34 are not horizontal, so in some examples, edges 32 and 34 are tilted and not necessarily perfectly vertical. The vehicle's upper rear edge 36 extending horizontally means that edge 36 is not vertical, so in some examples, edge 36 is inclined and not necessarily perfectly horizontal. Cargo passageway 38 having passageway height 42 and passageway width 44 substantially equal to and corresponding to doorway height 46 and doorway width 48 means that the magnitude of the doorway's height equals the magnitude of the passageway's height, and the magnitude of the doorway's width equals the magnitude of the passageway's width, thus the size of doorway 20 defines the cargo passageway 38. The expression, "the vehicle shifting the weather barrier apparatus," means that travel movement of vehicle 12 forces or causes at least part of weather barrier apparatus 10 or portions thereof to move (e.g., translate, rotate, swing, tilt, bend, etc.). The term, "axially slidable connection" as it pertains to coupling 136, means that sliding occurs in a direction parallel to the axial length of the coupling's first leg 146. Rearward facing edge 28 including first rear edge 32, second rear edge 34 and upper edge 36 does not necessarily mean that all three edges 32, 34 and 36 face rearward. In some examples, upper edge 36 is at the rear of vehicle 12 and includes rear portion 36a facing rearward and top portion 36b facing upward. In some examples, side structure 60 is rotated to a horizontal orientation and configured or used as a header structure. In some examples, header structure 58 is rotated to a vertical orientation and configured or used as a side structure. In some examples, brace 70 and/or the weight of upper seal member 24 urging upper seal member 24 to the forward position (FIG. 3) in combination with coupling 136 connecting upper edge seal 78 to side edge seal 126 urges side seal member 26 to a preparatory position (FIG. 9). Upper edge seal 78 and side edge seal 126 are examples of rear edge seal 198. Upper surface seal 80 and side surface seal 128 are examples of surface seal 224. Upper seal member 24 and side seal member 26 are examples of a seal member. Upper support member 62 and side support member 112 are examples of a support member. Upper panel 82 and side panel 130 are examples of a vehicle panel.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. A weather barrier apparatus comprising:
   a mount to couple to a wall of a loading dock, the mount having a pivot joint and a slider; and a seal to couple to the mount via the pivot joint, the pivot joint to enable the seal to pivot relative to the mount and the slider to enable the seal to translate in a direction substantially parallel relative to the wall, the seal having:
   a first flexible panel having a curved shape between a distal end and a proximal end when the first flexible panel is coupled to the mount, the first panel having a first radius of curvature when the first flexible panel is in a relaxed configuration and a second radius of curvature when the first flexible panel is in an activated configuration, the first flexible panel being in the relaxed configuration when the first flexible panel is not engaged by a vehicle and the first flexible panel being in the activated configuration when first flexible panel is engaged by the vehicle, the first flexible panel to conform to a shape of the vehicle when the vehicle is in engagement with the first flexible panel;
   a second flexible panel having a distal end and a proximal end, the first and second flexible panels being directly attached at their distal ends and at their proximal ends to define a cavity between the first flexible panel and the second flexible panel; and
   a guide positioned in the cavity and to extend between an inner surface of the first flexible panel and an inner surface of the second flexible panel, the guide to movably couple the first flexible panel and the second flexible panel to enable the first flexible panel to move between the relaxed configuration and the activated configuration.

2. The apparatus of claim 1, wherein the guide is to transmit at least one of a tensile force or a compression force between the first flexible panel and the second flexible panel.

3. The apparatus of claim 1, wherein the guide includes a plurality of guides positioned within the cavity.

4. The apparatus of claim 1, wherein the distal ends of the first and second flexible panels converge and the proximal ends of the first and second flexible panels converge when the first flexible panel is coupled to the second flexible panel.

5. The apparatus of claim 1, wherein the first flexible panel conforms to a shape of an area adjacent a rear edge of a vehicle when the rear edge of the vehicle engages the first flexible panel.

6. The apparatus of claim 1, wherein the first flexible panel includes a rear edge seal and a surface seal, the rear edge seal to sealingly engage a rear edge of a vehicle and the surface seal to sealingly engage a surface panel of the vehicle when the vehicle engages the seal.

7. The apparatus of claim 6, wherein the seal is to pivot and translate laterally relative to the wall when the rear edge of the vehicle engages the first flexible panel to enable the rear edge seal to sealing engage the rear edge of the vehicle and the surface seal to sealingly engage the surface panel of the vehicle.

8. A barrier apparatus comprising:
   a first seal assembly including a first mount and a first seal, the first mount to couple the first seal to a wall of a loading dock, the first mount having a first slider and a first pivot joint, the first pivot joint being positioned between a first end of the first seal and a second end of the first seal opposite the first end, the first seal being pivotally coupled to the first mount via the first pivot joint to enable the first seal to pivot relative to the wall, the first slider to enable the first seal to move vertically relative to the wall in a direction parallel to the wall, the first seal defining a first rear edge seal and a first surface seal, the first rear edge seal to engage a horizontal rear edge of a vehicle and the first surface seal to engage a horizontal upper surface of the vehicle when the vehicle is in engagement with the first seal, the first rear edge seal to conform to a shape of the horizontal rear edge of the vehicle and the first surface seal to conform to a shape of the horizontal upper surface of the vehicle when the vehicle is engagement with the first seal; and
   a second seal assembly including a second mount and a second seal, the second mount to couple the second seal to the wall of the loading dock, the second mount having a second slider and a second pivot joint, the second pivot joint being positioned between a first end of the second seal and a second end of the second seal opposite the first end, the second seal being pivotally coupled to the second mount via the second pivot joint to enable the second seal to pivot relative to the wall, the second slider to enable the second seal to move horizontally relative to the wall in a direction parallel to the wall, the second seal defining a second rear edge seal and a second surface seal, the second rear edge seal to engage a vertical rear edge of the vehicle and the second surface seal to engage a vertical side surface of the vehicle when the vehicle is in engagement with the second seal, the second rear edge seal to conform to a shape of the vehicle rear edge of the vehicle and the second surface seal to conform to a shape of the vertical side surface of the vehicle when the vehicle is in engagement with the second seal.

9. The apparatus of claim 8, wherein the first seal includes a first panel coupled to a second panel via guides positioned between the first and second panels, the guides to extend between inner surfaces of the respective first and second panels.

10. The apparatus of claim 8, wherein the first seal has a first radius of curvature when the first seal is not engaged by the vehicle and a second radius of curvature when the first seal is engaged by the vehicle, the first radius of curvature being different than the second radius of curvature.

11. The apparatus of claim 10, wherein the first radius of curvature varies between a first end of the first seal and a second end of the first seal.

12. The apparatus of claim 11, wherein the second radius of curvature varies between the first end of the first seal and the second end of the first seal.

13. The apparatus of claim 8, wherein the second seal includes a first panel coupled to a second panel via guides positioned between the first and second panels, the guides to extend between inner surfaces of the respective first and second panels.

14. The apparatus of claim 8, wherein the second seal has a first radius of curvature when the second seal is not engaged by the vehicle and a second radius of curvature when the second seal is engaged by the vehicle, the first radius of curvature being different than the second radius of curvature.

15. The apparatus of claim 14, wherein the first radius of curvature varies between a first end of the second seal and a second end of the second seal.

16. The apparatus of claim 15, wherein the second radius of curvature varies between the first end of the first seal and the second end of the first seal.

17. The apparatus of claim 8, wherein the first seal assembly comprises a header and the second seal assembly comprises a side seal.

* * * * *